(12) United States Patent
Sarwat et al.

(10) Patent No.: US 10,958,211 B1
(45) Date of Patent: Mar. 23, 2021

(54) SYSTEMS AND METHODS FOR POWER MANAGEMENT

(71) Applicants: Arif Sarwat, Miami, FL (US); Aditya Sundararajan, Miami, FL (US); Temitayo O. Olowu, Miami, FL (US)

(72) Inventors: Arif Sarwat, Miami, FL (US); Aditya Sundararajan, Miami, FL (US); Temitayo O. Olowu, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 52 days.

(21) Appl. No.: 16/881,984

(22) Filed: May 22, 2020

Related U.S. Application Data

(60) Provisional application No. 62/910,929, filed on Oct. 4, 2019.

(51) Int. Cl.
  *H02S 40/32* (2014.01)
  *H02S 40/38* (2014.01)
  *G05F 1/67* (2006.01)

(52) U.S. Cl.
  CPC .............. *H02S 40/32* (2014.12); *G05F 1/67* (2013.01); *H02S 40/38* (2014.12); *H02J 2300/26* (2020.01)

(58) Field of Classification Search
  None
  See application file for complete search history.

(56) References Cited

U.S. PATENT DOCUMENTS

| | | | |
|---|---|---|---|
| 2014/0200717 A1* | 7/2014 | Tilley | F24S 50/20 700/275 |
| 2019/0207391 A1* | 7/2019 | Fazeli | H02M 7/48 |
| 2020/0259358 A1* | 8/2020 | Hansen | H01M 10/425 |

* cited by examiner

*Primary Examiner* — Jared Fureman
*Assistant Examiner* — Joel Barnett
(74) *Attorney, Agent, or Firm* — Saliwanchik, Lloyd & Eisenschenk

(57) ABSTRACT

Devices and methods for providing a mobile source of power for many different types of situations are provided. A portable emergency alternating current (AC) energy (PEACE) Supplier can serve as a mobile source of power for users with photovoltaic (PV) and/or energy storage systems during power outage situations caused by normal or extreme scenarios. A Supplier can also be used to provide power when weather conditions result in insufficient solar energy for the user's needs.

20 Claims, 35 Drawing Sheets

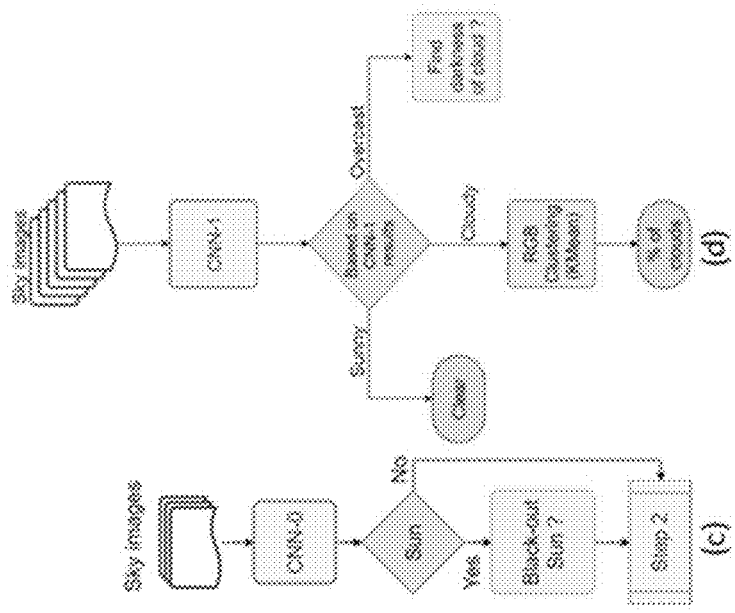
FIG. 13(d)
FIG. 13(c)
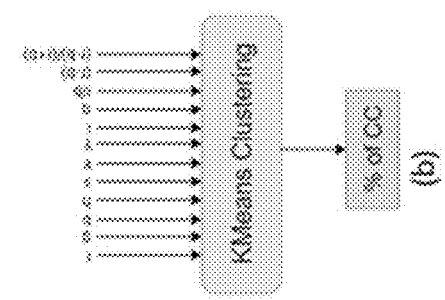
FIG. 13(b)
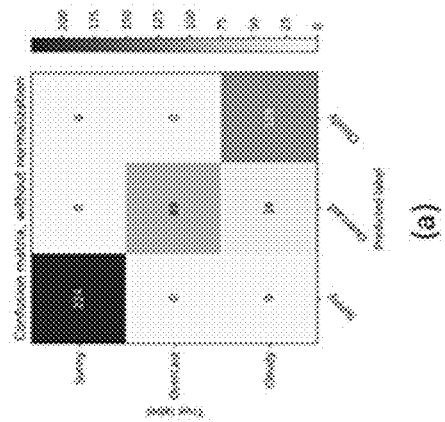
FIG. 13(a)

Linear regression between PV generation and irradiance

Linear regression between PV generation and module temperature

Linear regression between PV generation and ambient temperature

SYSTEMS AND METHODS FOR POWER MANAGEMENT

CROSS-REFERENCE TO RELATED APPLICATION

This application claims the benefit of U.S. Provisional Application Ser. No. 62/910,929, filed Oct. 4, 2019, which is hereby incorporated by reference herein in its entirety, including any figures, tables, and drawings.

BACKGROUND

Power outages occur for a variety of reasons, including natural disasters or overloading of the power grid. Photovoltaic (PV) cells or storage systems can be used to harness solar energy and minimize the effects of certain types of power outages. However, solar energy is not reliable and can be affected by cloud cover and other weather-related factors.

BRIEF SUMMARY

Embodiments of the subject invention provide novel and advantageous devices and methods for providing a mobile source of power for many different types of situations. A portable emergency alternating current (AC) energy (PEACE) Supplier (can be referred to as just "Supplier" in some instances herein) or PEACE renewable generator (can be referred to as a "PEACE-RenGen" or just "RenGen" in some instances herein) can serve as a mobile source of power for users with photovoltaic (PV) and/or energy storage systems (e.g., residential PV and/or energy storage systems) during power outage situations caused by normal or extreme (i.e., hurricane) scenarios. A Supplier can also be used to provide power when weather conditions result in insufficient solar energy for the user's needs. The Supplier enables a seamless three-way connection between a PV cell or system, an energy storage unit (ESU), and the power grid (e.g., AC grid), all of which can be connected through an inverter. A key objective is to ensure continued supply of adequate power for the user, including to all emergency appliances (e.g., emergency appliances of the user residence). The Supplier can meet user demand through the ESU and/or the external grid. Therefore, the external grid is an optional source, making embodiments applicable for remote installations where there is no access to the utility grid.

In an embodiment, a system for managing power can comprise: a battery bank comprising at least one battery; a PV module comprising at least one solar panel; an inverter in operable communication with the battery bank and the PV module; a microcontroller in operable communication with the inverter, the battery bank, and the PV module; a machine-readable medium that uses information from the microcontroller to derive a power sharing plan; and a processor in operable communication with the machine-readable medium. The machine-readable medium can have instructions stored thereon that, when executed by the processor, perform a forecast model and a power sharing algorithm using the information from the microcontroller to derive the power sharing plan for power distribution and storage among the PV module, the battery bank, and a load connected to the system. The machine-readable medium can comprise a graphical user interface (GUI) configured to allow a user to enter constraints for the power sharing plan. The microcontroller can comprise a wireless module (e.g., a WiFi module) configured to wirelessly communicate with a remote database and to send data from the battery bank and the PV module to the remote database, and the machine-readable medium can obtain the information from the microcontroller via the remote database. The system can further comprise a plurality of temperature sensors in operable communication with the microcontroller, the plurality of temperature sensors measuring a temperature of the PV module, a temperature of the battery bank, and an ambient temperature. The system can further comprise a current sensor and a voltage sensor both in operable communication with the microcontroller, the current sensor measuring a current of the system, and the voltage sensor measuring a voltage of the system. The information from the microcontroller can comprise a real-time temperature of the PV module, a real-time temperature of the battery bank, and a real-time ambient temperature; the forecasting model can use as inputs historical values of the temperature of the PV module, the temperature of the battery bank, and the ambient temperature to provide a forecast temperature of the PV module, a forecast temperature of the battery bank, and a forecast ambient temperature; and the power sharing algorithm can use as inputs the forecast temperature of the PV module, the forecast temperature of the battery bank, and the forecast ambient temperature to output the power sharing plan. The information from the microcontroller can further comprise a real-time current of the system and a real-time voltage of the system; the forecasting model can further use as inputs historical values of the current of the system and the voltage of the system to provide a forecast current of the system and a forecast voltage of the system; and the power sharing algorithm can further use as inputs the forecast current of the system and the forecast voltage of the system to output the power sharing plan. The power sharing plan can meet the following constraints: a demand for power of the user is met; purchasing of power from a power grid is minimized; PV generation is maximized; and a state of charge (SOC) of each battery of the at least one battery is within its acceptable bounds. The inverter can comprise a maximum power point tracker (MPPT) controller. The machine-readable medium can have further stored thereon a battery SOC lookup table, the battery SOC lookup table being generated using an open circuit voltage method. The power sharing algorithm can use the battery SOC lookup table when deriving the power sharing plan.

In another embodiment, a method for managing power can comprise: providing a power system comprising a battery bank comprising at least one battery, a PV module comprising at least one solar panel, an inverter in operable communication with the battery bank and the PV module, and a microcontroller in operable communication with the inverter, the battery bank, and the PV module; measuring, by a plurality of sensors, parameters of the power system and the ambient environment; sending the parameters to the microcontroller; sending, by the microcontroller, the parameters to a remote database; obtaining, by a machine-readable medium, the parameters from the remote database; performing, by a processor in operable communication with the machine-readable medium, a forecast model using the parameters to generate a first output; and performing, by the processor, a power sharing algorithm using the first output as an input to derive a power sharing plan for power distribution and storage among the PV module, the battery bank, and a load connected to the power system. The machine-readable medium can comprise a GUI configured to allow a user to enter constraints for the power sharing plan. The microcontroller can comprise a wireless module (e.g., a WiFi module) configured to wirelessly communicate with the remote database. The plurality of sensors can comprise a plurality of temperature sensors; the parameters can comprise a temperature of the PV module, a temperature of the battery bank, and an ambient temperature; and the first output can comprise a forecast temperature of the PV module, a forecast temperature of the battery bank, and a forecast ambient temperature. The plurality of sensors can comprise a current sensor measuring a current of the power system and a voltage sensor measuring a voltage of the system; the parameters can comprise the current of the power system and the voltage of the power system and the first output can comprise a forecast current of the power system and a forecast voltage of the power system. The power sharing plan can meet the following constraints: a demand for power of the user is met; purchasing of power from a power grid is minimized; PV generation is maximized; and an SOC of each battery of the at least one battery is within its acceptable bounds. The machine-readable medium can have stored thereon a battery SOC lookup table, the battery SOC lookup table being generated using an open circuit voltage method. The power sharing algorithm can use the battery SOC lookup table when deriving the power sharing plan. The inverter can comprise an MPPT controller.

BRIEF DESCRIPTION OF DRAWINGS

FIG. 13(a) shows a confusion matrix; FIG. 13(b) shows a diagram of K-means clustering; FIG. 13(c) shows a diagram of a CNN; and FIG. 13(d) shows a diagram of a CNN.

DETAILED DESCRIPTION

Figure 1:
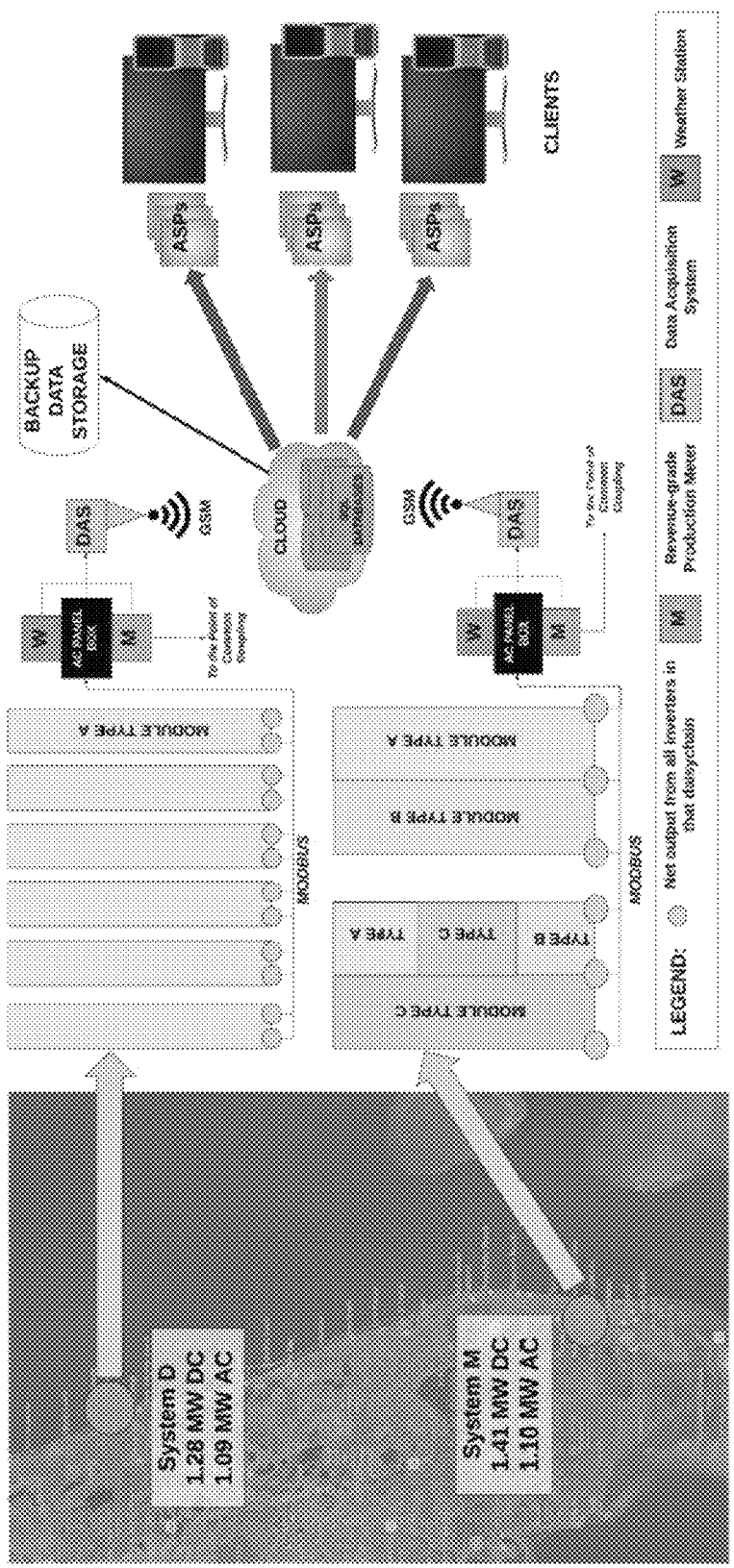
FIG. 1 shows a high-level architecture of two systems for collecting and visualizing real-time data.

Embodiments of the subject invention provide novel and advantageous devices and methods for providing a mobile source of power for many different types of situations. A portable emergency alternating current (AC) energy (PEACE) Supplier (can be referred to as just "Supplier" in some instances herein) or PEACE renewable generator (can be referred to as a "PEACE-RenGen" or just "RenGen" in some instances herein) can serve as a mobile source of power for users with photovoltaic (PV) and/or energy storage systems (e.g., residential PV and/or energy storage systems) during power outage situations caused by normal or extreme (i.e., hurricane) scenarios. A Supplier can also be used to provide power when weather conditions result in insufficient solar energy for the user's needs. The Supplier enables a seamless three-way connection between a PV cell or system, an energy storage unit (ESU), and the power grid (e.g., AC grid), all of which can be connected through an inverter. A key objective is to ensure continued supply of adequate power for the user, including to all emergency appliances (e.g., emergency appliances of the user residence). The Supplier can meet user demand through the ESU and/or the external grid. Therefore, the external grid is an optional source, making embodiments applicable for remote installations where there is no access to the utility grid.

In embodiments, the ESU can be charged in two ways: through the PV system; or from the external grid via the inverter. The inverter can be capable of bidirectional conversion (direct current (DC) from a battery to AC, as well as AC from the grid to DC), which means both the grid and the PV can be used simultaneously to charge the ESU. Prior to some natural disasters, such as hurricanes, people are given warning ahead of time. Based on the amount of time given by the warning, both the grid and the PV can be used simultaneously to charge the ESU quickly. Once the natural disaster has passed, the ESU can prioritize its charging from the PV system alone to minimize costs of buying power from the grid, or in the case that there is an extended power outage and the grid has failed. A PEACE Supplier can automatically charge the ESU and reserve power for when it is needed.

In embodiments, the system can include a web portal and/or an application (app) configured to communicate with the Supplier. The web portal and/or app can show the system's data and status. The PEACE Supplier can be vendor- and product-neutral, its hardware and software modules designed to work with any type of PV panel, hybrid inverter(s), and/or ESU. The Supplier can also be compatible with AC grids of the United States, Europe, and Asia considering their varying voltage specifications.

One of the functions will feature a web portal, as well as an app, that can show the system's data and status. The PEACE Supplier is vendor and product-agnostic since its hardware and software modules are designed to work with any type of PV panel, hybrid inverters, or ESU. The Supplier will also be compatible with AC grids of the USA, Europe, Asia, and/or other jurisdictions, considering their varying respective voltage specifications.

PEACE Suppliers of embodiments of the subject invention can have the following objectives: (1) a hardware configuration with a commercial-grade connected ESU, solar panel (e.g., PV), and AC grid, optionally with adequate provisions for integrating existing backup devices (e.g., gas/diesel generators) and/or advanced protection devices (e.g., circuit breakers and relays); (2) a data acquisition unit to sense voltage, current, and/or local weather parameters; (3) a web interface and/or app to monitor system performance; and (4) implementation of advanced analytics, including one or more of the following: (a) image processing-driven cloud coverage detection using convolutional neural networks and computer vision, and forecasts of cloud cover % using deep learning models; (b) a hybrid data-model method (HDMM) using historical generation and system-specific deration factors for numerically estimating PV generation; (c) univariate forecasts of irradiance, ambient temperature, module temperature, humidity, precipitation, and/or other weather parameters; (d) parametric regression that takes results from the univariate forecasts and gives regression model outputs correspondingly; (e) a multilayer perception (MLP) trained using particle swarm optimization (PSO) to take outputs from (a), (b), and (d) as features to predict correspondingly the value of PV generation; (f) energy performance index (EPI) and power performance index (PPI) to evaluate and compare performances of PV systems; (g) computation of state of charge (SOC) and other parameters for the ESU using the sensed voltage and current parameters; (h) a three-way power sharing algorithm using the forecasts of PV generation, demand, and ESU SOC to propose cost-effective supply-demand matches; and (i) appliance usage/ESU charging recommendation for users.

Embodiments of the subject invention provide solutions for a variety of users, including those affected by natural disasters, those from low-income families, and individuals interested in using renewable energy. This includes people who cannot afford the full expense of fixed PV panel installations on roofs since installation and maintenance costs tend to be very high. PEACE Suppliers also provide solutions for third-world citizens without regular access to power or a consistent backing of a sturdy AC grid. PEACE Suppliers can help inspire people to accept solar energy by using cheap, efficient solar panels, and this is especially advantageous because 56% of the world's population is low-income. Embodiments can be used by residential and small-scale commercial users for providing continued energy supply to emergency appliances during and after extreme (and normal) natural events, including but not limited to hurricanes.

Embodiments of the subject invention provide many advantages over the related art. Although rooftop PVs with or without energy storage exist at the residential level, they have been developed with the objectives of net metering and other incentives that do not align with disaster recovery and resilience. Existing approaches employ fixed rooftop installations that incur high costs in maintenance and troubleshooting, but the scope of PEACE Suppliers extends beyond urban and suburban residences and into rural and remote areas where there might not even be a grid connection. The portable nature and modular design of the Supplier ensures easy transport, ready access, and convenient deployment and setup. The Supplier employs an intelligent control module that seamlessly ties the PV, ESU, and the AC grid to meet the user demand at all times in the most economical manner. The module also embeds forecasting intelligence to offer recommendations to users about future energy usage patterns, which related art devices do not do.

Existing "portable solar generators" are compact products comprising an in-built battery-based energy storage element and AC/DC converters that can be externally plugged to a solar panel to supply power to appliances. PEACE Supplier provide advantages over these by including a unique, intelligent controller module that is also capable of making customized recommendations and power sharing that these related art devices do not possess. The control and intelligence of the Supplier are local to the system, and there can be interaction with other similar devices and the utility control center only for aggregation and emergency purposes but not necessarily for day-to-day activities. This makes the PEACE Supplier an ideal product to be used during a hurricane and in post-hurricane situations where communication might be difficult to obtain.

Increasing installed capacities of PV systems in the distribution smart grids has created the need for utilities to have visibility and control over PV systems for monitoring their generation and efficiently utilizing it at the local level, as well as evaluating performance and capturing and responding to system alerts. Overall, the visibility and control also aid in the utility's distribution planning operations and enhancing the accuracy of demand response, unit commitment, and other power system applications. This level of intelligence requires the deployment of data-driven models that must also account for consumer privacy and associated cybersecurity challenges, considering the interdependency between data and security. Although existing PV penetration levels at the distribution grids have minimal impacts on the feeder in terms of voltage and frequency fluctuations, future scenarios would require active monitoring, control and response to the fluctuations triggered by weather variations and dynamic conditions induced by connected loads such as electric vehicles. These have created the need for utilities to engage in measuring and estimating the performance of PV systems over time to make the best use of their generation.

Utilities currently rely on third-party vendors to provide the required visibility on remotely located grid-tied and standalone distributed PV systems, including those at the consumer-end such as rooftop and community PV. Concepts such as net metering, transactive energy, incentivization, and demand response are explored by these vendors. However, most of these tools provide performance ratio (PR) as a standard metric for performance measurement, which, although independent of generation capacity, is ineffective in comparing performances of PV systems at different times of the year and/or subject to different climatic conditions. Further, most of the widely used metrics assume standard test conditions (STC) for different weather parameters such as ambient temperature, irradiance, and module temperature, and do not consider the effects of soiling, shading, and cabling, which leads to an inaccurate quantification of PV performance. This calls for the search for metrics that enable seamless comparison of PV performance, given differences in locations, climatic conditions, and generation capacities.

For the year 2017, a case study of two PV systems (M and D, located at Miami and Daytona, respectively) was performed, with corresponding generation capacities of 1.4 MW and 1.28 MW DC. A five-step process was used to analyze and compare performance of the two systems.

Below is further discussion on the case study, including: (1) presenting a comprehensive process for evaluating the performance of PV systems and comparing them irrespective of their location or capacity; (2) using EPI and PPI, two effective metrics, to quantify PV system performance and directly compare systems; (3) analyzing the strength of relationship between local weather parameters and system generation to determine a potential use-case for aggregation to manage dynamic demands in future high-penetration scenarios; and (4) providing the utilities with a roadmap for conducting planning operations, and further understanding how systems perform over longer periods of time and how they can be leveraged for large-scale studies such as aggregation and transactive energy.

The performance of PV systems has been studied well in the related art, both at system level and module-level. In-depth analysis of PV performance for a special case of the partial solar eclipse of Aug. 21, 2017 has been conducted to demonstrate how critical the problem of PV performance analysis is for operators under high penetration scenarios. A similar study with a similar scope was conducted for normal scenarios as part of the Task 2 of the Photovoltaic Power Systems Program (PVPS) of the International Energy Agency (IEA). This study was conducted on 21 selective PV systems to compare their performances using measured yield and PR that do not yield accurate comparisons across all systems since they belong to different geographical locations. Separate analyses on the impacts of PV performance at the grid-level in terms of Volt/Var control and grid-integration have been evaluated. Two works have independently conducted performance analysis of PV systems of different sizes (5 kW and 40 kWp) but limited their analysis to metrics such as PR, capacity factor, and yield that have specific limitations discussed later in this paper. Simulation analysis of PV performance has also been conducted, which are based on the P-V, I-V, and P-I curve characteristics; however, it is typically harder to model all real-world dynamisms in the MATLAB/Simulink models, and this approach might, hence, fall short when compared to the studies based on real-world PV systems as is the proposed case study.

The monthly energy yield and failure data from multiple PV systems of Taiwan that have a net capacity of 13.5 MW to compute the average PR and availability have been analyzed. However, it should be noted that average PR is not the best metric to be used in this case, since the PV systems were geographically separated across the country. The impact of solar eclipse on PV generation has been analyzed, where the net PV generation on the day of the eclipse was compared with the PV generation on the same day, previous year, and the PV generation on the day before the eclipse. The study, however, did not account for the PV performance in its evaluations. Performance metrics used in the presented case study and defined below are derived from industry-accepted metrics that go beyond PR. Different metrics for PV performance have been analyzed, but yield and capacity factor that depend on PDC were considered, as well as PR that depends on PV model and local weather.

The distinction between PV generation estimation and prediction is crucial. The estimation is more deterministic in nature since it uses the known values of irradiance, ambient temperature, and module temperature to calculate the known values of generation. However, prediction uses the known input values to forecast, with a degree of uncertainty, the unknown values of generation. The scope of the present case study is limited only to estimation techniques. Different methods have been proposed to estimate PV generation at the module and system levels.

Rooftop PV generation can be estimated using an optimization model to fine-tune the factors impacting PV generation and efficiency, which ultimately affect the return on investment from the plant. Although the study relies primarily on sensitivity analysis to study the degree of impacts, the genetic algorithm-based optimization used ideal, model-derived values for inverters and PV modules, thereby not accounting for the impacts of seasonal variations. No existing methods, though, consider the degradation of the PV system because of derate factors. Derate factors are the different environmental factors and system design characteristics that impact the amount of AC power effectively generated by the PV system. These factors not only include the DC to AC conversion efficiency of the string inverters, but also other factors such as losses caused by DC and AC wiring (cabling), deposition of soil granules over the PV modules (soiling), obstruction of sunlight caused by shadows of adjacent modules, trees or buildings (shading), and the module mismatch. These parameters can be quantitatively captured in the form of factors as shown in Table 1, such that the product of these individual scalar values represents the net derate factor for the PV system. These factors will herein be collectively referred to as "derate factors". In summary, a majority of the related art works that include derate factors when calculating their metrics only calculate uncorrected PR that has practical limitations. Other works use metrics alternative to uncorrected PR, but do not account for derate factors. Therefore, this presents the need for estimation methods that account for losses and derate factors, and metrics that can compare performances of differently sized PV systems located at regions experiencing different weather conditions.

For embodiments of the subject invention, layouts of PV systems, M and D, are shown in FIG. 1 System D comprises six arrays of 4,200 PV modules and has a mix of eight types of daisy chained string inverters. In FIG. 1, the grey-colored circle at the end of each array represents the aggregated energy output from all daisy-chained inverters along that array, which are then summed and sent to the main AC panel box. The same topology applies to System M, except that it comprises 46 daisy-chained string inverters of the same model, and has 4,480 PV modules. The other system-level parameters used in the study are summarized in Table 1. In both systems, revenue grade production meters are used to record the net energy generated, beyond which the point of interconnection to the grid's feeders exist.

The PV modules with a conversion efficiency of 16% and smart inverters with different nameplate ratings and manufactured by different vendors are used by the two systems. Specifically, name-plate rating of the inverters of System D ranges between 23 kW and 36 kW, and those in System M are sized at 24 kW. Although System D has generated a cumulative energy of 2.3 GWh since Jun. 26, 2016, System M has been functional from Jul. 19, 2016 with a cumulative generation of 2.46 GWh.

Each system has its own local weather station that measures irradiance, ambient temperature, and module temperature. Data acquisition systems (DASs) capture the energy production of individual inverters as well as that of the entire system, and weather data in 15-minute intervals and send them via secure Global System for Mobile (GSM) channels to structured query language (SQL)-based databases hosted by a software as a service (SaaS) cloud model. Application service providers (ASPs) exist for interfacing clients with the processed and stored time-series data, where clients might access data using desktop, web, or mobile applications. This data, comprising irradiance, ambient temperature, module temperature, and energy production (both of individual inverters and the net energy recorded by the system's production meter), was expected to have 35,040 observations for the year of 2017.

However, considering the measurement issues encountered in the DASs, and the brief disruption in service caused by hurricane Irma, the effective number of data observations was reduced to 29,952 for System M and 29,088 for system D.

TABLE 1

Parameters for Performance Monitoring of Systems M and D

| Parameter | System M | System D |
| --- | --- | --- |
| Location | Miami | Daytona |
| Latitude-Longitude | 25.76° N, 80.36° W | 29.18° N, 81.05° W |

TABLE 1-continued

Parameters for Performance Monitoring of Systems M and D

| Parameter | System M | System D |
| --- | --- | --- |
| Elevation (ft) | 10 | 33 |
| Nameplate rating (MW) ($P_{DC}$) | 1.4 | 1.28 |
| AC Capacity (MW) | 1.104 | 1.035 |
| Number of inverters | 46 | 36 |
| Number of inverter models | 1 | 8 |
| CEC inverter efficiency ($P_{inverter}$) | 0.98 | 0.975-0.986 |
| Number of PV modules | 4,480 | 4,200 |
| Module efficiency (%) | 16.5 | 16.5 |
| Number of strings in series × number of arrays | 56 × 4 | 35 × 6 |
| Modules per string | 20 | 20 |
| Tilt, Azimuth of array | 5°, 268° | 5°, 268° |
| Soiling derate factor ($p_{dirt}$) | 0.9 | 0.9 |
| Cabling loss factor ($p_{cable}$) | 0.99 | 0.99 |
| Temperature coefficient ($\%_{temp_{coeff}}$) | −0.5 | −0.5 |
| Module mismatch factor ($p_{mismatch}$) | 0.97 | 0.97 |

Figure 2:
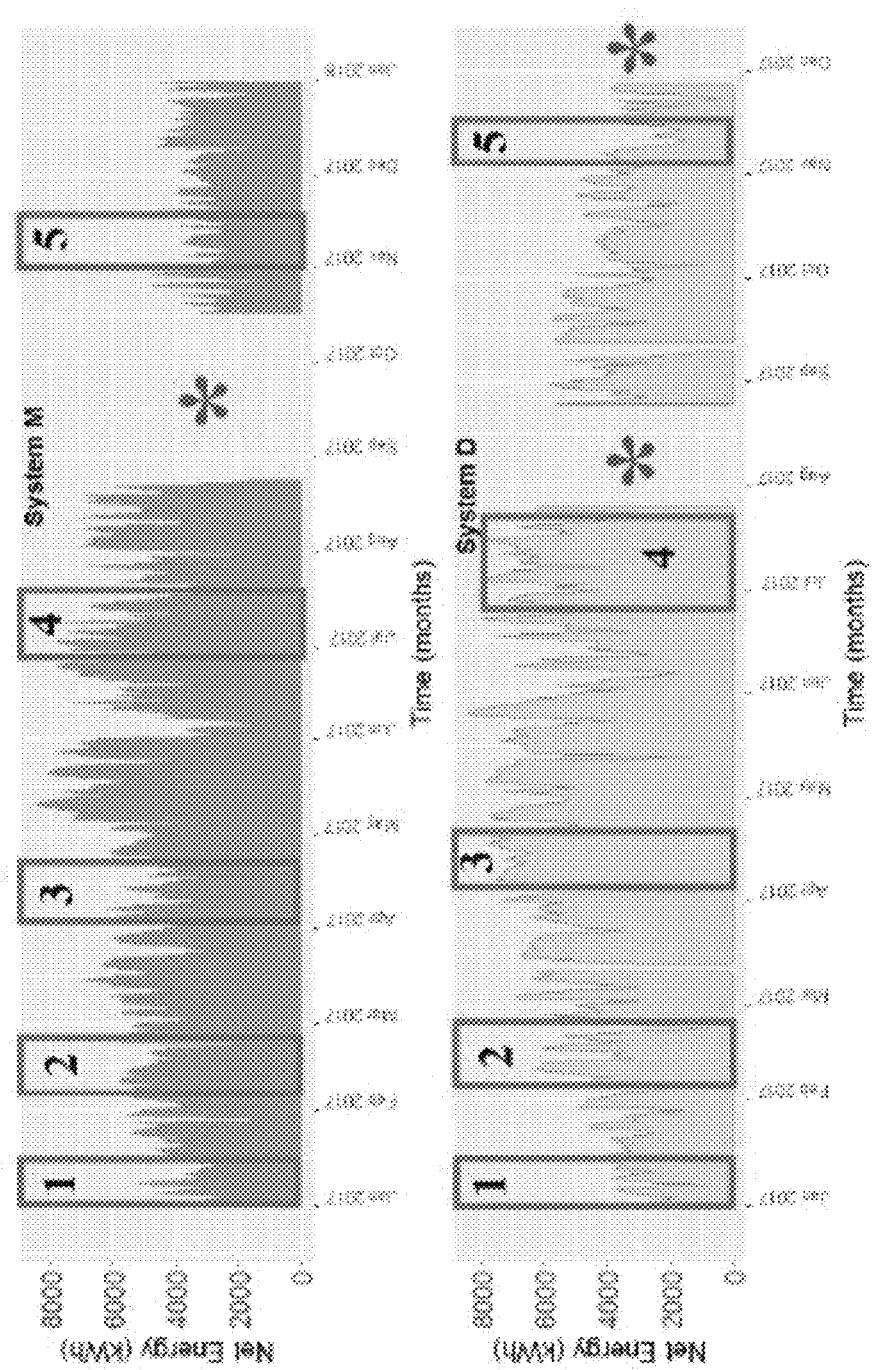
FIG. 2 shows net energy generation profiles of two systems.

Consequently, hurricane Irma was considered as an extreme event, and hence its effects on both data acquisition as well as system performance were ignored. Performance of the systems, however, was still measured for the period of the hurricane (August to October, 2017) but not included in the comparison. A plot of the generation profiles of the two systems for 2017 is shown in FIG. 2, where it can be seen that System M exhibited a high average generation between April and September, and a low average generation between November and January.

The portions marked by an asterisk (*) denote the time periods for which the DASs reported no data whereas green boxes in the figure illustrate potential windows of time when one system produced more energy than the other. In favorable situations, the utility might want to exchange the surplus from one system to meet the deficit caused at the other system. Miami and Daytona could have different but complementary weather conditions (cloudy in one location and sunny in other, for example) at a given time, which makes this behavior potentially advantageous.

Data recorded from PV systems should be processed and cleaned before being used for any further analysis. The process described by FIG. 6 considers an organized sequence of preprocessing and cleaning steps that includes formatting, restructuring, handling missing values, and detecting outliers. To determine the structure and properties of individual datasets, exploratory visualizations are necessary. Missing records were omitted in this analysis. Alternatively, imputation techniques to estimate missing data could be developed. However, this is beyond the scope of the case study. Using the roadmap presented in Sundararajan et al. ("Roadmap to prepare distribution grid-tied photovoltaic site data for performance monitoring," International Conference on Big Data, IoT and Data Science (BID), pp. 101-115, 2017, which is hereby incorporated by reference herein in its entirety), statistical analyses were conducted to understand the characteristics of the data through box plots to identify the data properties such as mean, median, and quartile distributions, linear correlation to study the relationship between irradiance, ambient temperature, module temperature and PV generation, and finally linear regression to determine the influence of each of the aforementioned weather parameters on the generation.

A linear regression model is generically represented by: $y=\alpha+\beta x+\notin$, where $\alpha$ denotes the intercept $\beta$, represents the slope, also called the variable's coefficient, and $\notin$ the error.

TABLE 2

Table summarizing the key statistical parameters for the three weather parameters of PV generation

| System | Intercept | | | | Coefficient | | | | $R^2$ | Adjusted $R^2$ |
|---|---|---|---|---|---|---|---|---|---|---|
| | Estimate | Std. Error | L-value | p-value | Estimate | Std. Error | L-value | p-value | | |
| System $M$ (Irradiance) | 3.333 | 1.074 | 3.104 | 0.002 | 1.012 | 0.023 | 446.49 | ≈0 | 0.9303 | 0.9308 |
| System $D$ (Irradiance) | 22.063 | 0.724 | 30.49 | ≈0 | 0.924 | 0.001 | 635.44 | ≈0 | 0.9633 | 0.9633 |
| System $M$ (Module Temperature) | 87.154 | 7.242 | 12.04 | ≈0 | 3.363 | 0.076 | 44.46 | ≈0 | 0.1169 | 0.1169 |
| System $D$ (Module Temperature) | −445.2 | 65.822 | −6.763 | $1.4 \times 10^{-11}$ | 5.424 | 0.433 | 12.52 | ≈0 | 0.01009 | 0.01002 |
| System $M$ (Ambient Temperature) | 253.384 | 7.861 | 34.33 | ≈0 | 1.631 | 0.081 | 20.02 | ≈0 | 0.02616 | 0.02009 |
| System $D$ (Ambient Temperature) | 4659387 | 3685798 | 1.282 | 0.2 | 230044 | 179990 | 0.2 | ≈0 | 0.0001 | ≈0 |

Figure 3A:
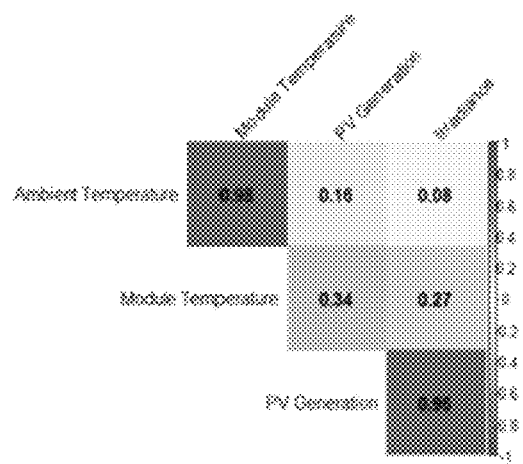
FIG. 3(a) shows a correlation matrix for System M.
Figure 3B:
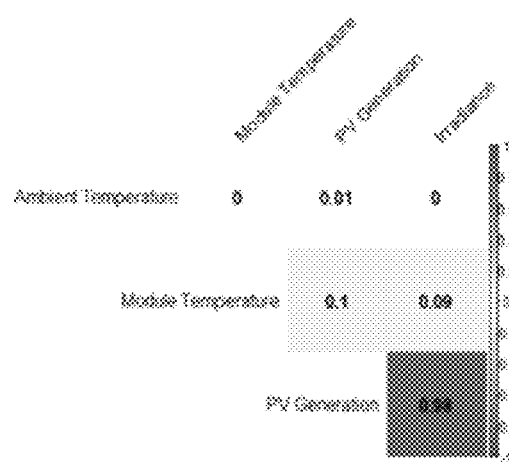
FIG. 3(b) shows a correlation matrix for System D.

Pearson correlation analysis was conducted to build a correlation matrix, and is shown in FIG. 3. Given a sample pair of values $(x_i, y_i)$ such that $i \in [1,n]$, $\forall i \in \mathbb{Z}^+$, where n is the total number of samples, the correlation coefficient, $\rho$, is calculated using the following equation:

$$\rho = \frac{n(\Sigma x_i y_i) + \Sigma x_i \Sigma y_i}{\sqrt{n\Sigma x_i^2 - (\Sigma x_i)^2} \sqrt{n\Sigma y_i^2 - (\Sigma y_i)^2}} \quad (1)$$

where, $p \in [-1, +1]$. From FIG. 3, it can be seen that all three weather parameters did not have a negative correlation coefficient for both systems with respect to the generation. It can also be seen that irradiance had a very high correlation with generation as compared to the temperature values. Between ambient and module temperature, however, the latter had a higher correlation with generation. This positive relationship between variables shows that the three variables are potentially good candidates to explore further. However, correlation does not provide insight into the dependency between these variables; it cannot be concluded yet from this study that irradiance had the greatest influence on PV generation.

Figure 4:
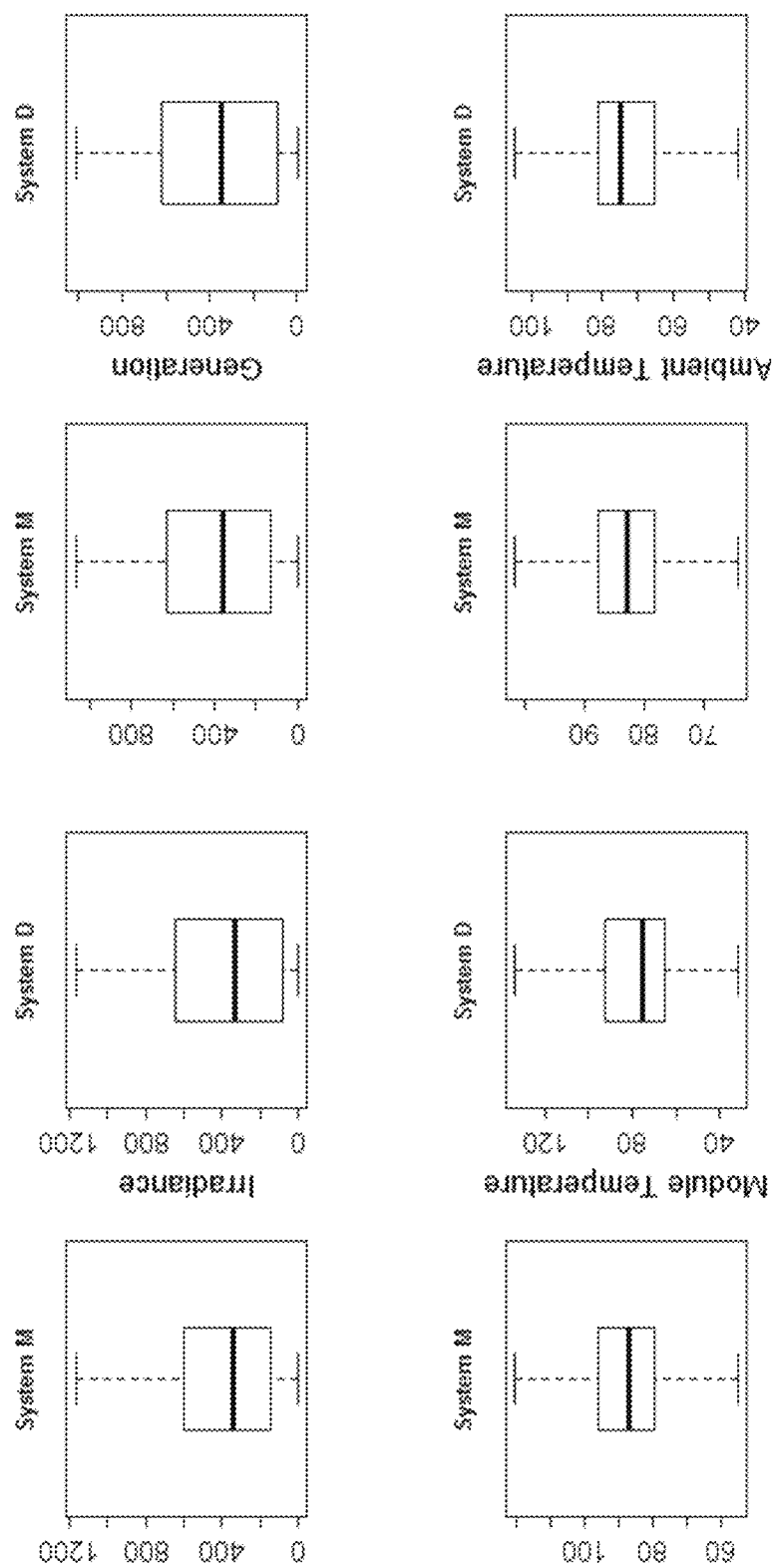
FIG. 4 shows boxplots of the different datasets corresponding to System M and System D.

Boxplots could be studied to understand how these individual data values are distributed over the sample space, and also to detect outliers. This is shown in FIG. 4, where the solid lines inside the boxes represent the sample median, while the boxes themselves represent the second and third quartile groups. Irradiance for both systems had a skewed distribution, since the median was well below the average, with a higher quartile range above. Between systems, System M had narrower second and third quartile groups as compared to System D's. A similar trend is reflected in the PV generation boxplots as well. The ambient module temperature values for the two systems were less skewed as their medians were closer to their averages. The range of values in their first and last quartile groups is also comparable, unlike irradiance's. This, combined with correlation, shows that irradiance could potentially have a stronger influence on PV generation. To fully confirm this, a linear regression model can be built.

Figure 5:
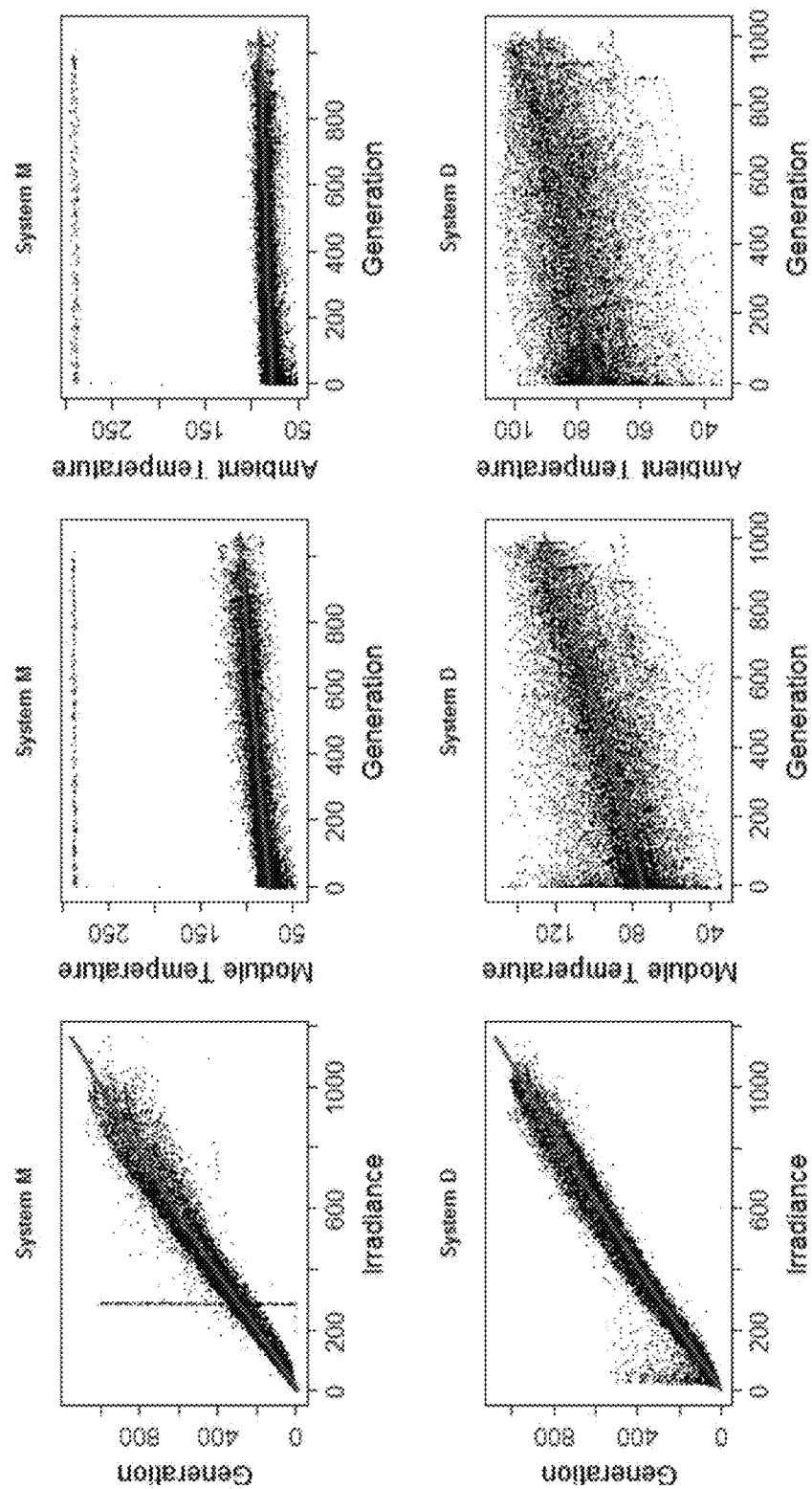
FIG. 5 shows results of linear regression models fitted to the different datasets that best capture the PV generation behavior for two systems.

$\alpha$ and $\beta$ are together called regression coefficients. Linear regression models for the results shown in FIG. 5 are built such that y takes on the PV generation values while x represents the three weather parameters, considered one at a time. The result is six different linear models for the two systems that provide the best fit model for PV generation. It can be seen from FIG. 5 that the dependence between irradiance and generation was very strong for both systems, and a linear model could be fit. The same holds true for the temperature values for System M However, for System D, the module and ambient temperatures had a slightly nonlinear fit. These models could now be tested for statistical significance using the null hypothesis test.

The null hypothesis considered here is that there is no relationship between each weather parameter and generation, considering a predetermined statistical significance level of 0.05. The model's statistical significance is denoted by the p-value that is calculated using the set of equations in Eq. (2) for a given standard deviation, and standard error, SE. Table 2 shows SE, p-value, and t-value of each linear model for the two systems. A smaller p-value implies a greater statistical significance and increases the likelihood that the null hypothesis is incorrect. This implies that the null hypothesis might be rejected on grounds of a p-value lower than 0.05 (the default threshold). However, p-value is not a measure of probability that the null hypothesis is true, or that the null hypothesis can be rejected with certainty. The low p-values in the table, considered in conjunction with the patterns observed in boxplots and correlation matrix, could provide suit-able grounds for the rejection of null hypothesis and conclude that there is a significant likelihood for irradiance, module temperature, and ambient temperature to impact PV generation.

$$SE = \frac{\sigma}{\sqrt{n}}, \quad (2)$$

$$t - \text{value} = \frac{\beta - \alpha}{SE},$$

$$p - \text{value} = P(>|t - \text{value}|)$$

This is further observed from the $R^2$ and adjusted $R^2$ values that provide information on how much of the variations in PV generation values are captured by the linear model. They are calculated by:

$$SSE = \sum_i^n (y_i - \hat{y}_i)^2, SST = \sum_i^n (y_i - \bar{y})^2, R^2 = 1 - \frac{SSE}{SST} \quad (3)$$

$$MSE = \frac{SSE}{(n-q)}, MST = \frac{MST}{(n-1)}, \quad (4)$$

$$AdjustedR^2 = 1 - \frac{MSE}{MST}$$

where, $\hat{y}_i$ is the fitted value for $y_i$ and $\bar{y}$ is the sample mean. As shown in Eq. (3), SSE is the sum of squared errors and SST the sum of squared total. Similarly, MSE is the mean squared error, MST the mean squared total, and q the number of coefficients in the linear model. Higher values of $R^2$ and adjusted $R^2$ are preferred, and from Table 2, it can be seen that the values are as high as 0.96 and 0.93 for the irradiance with respect to generation for Systems D and M, respectively. Between the two types of temperature, module temperature has relatively higher R and adjusted $R^2$ values.

These statistical exploratory analyses provide a very clear insight into the nature and type of the weather parameters considered, and how closely they are related to PV generation irrespective of the system size, location or design.

Figure 6:
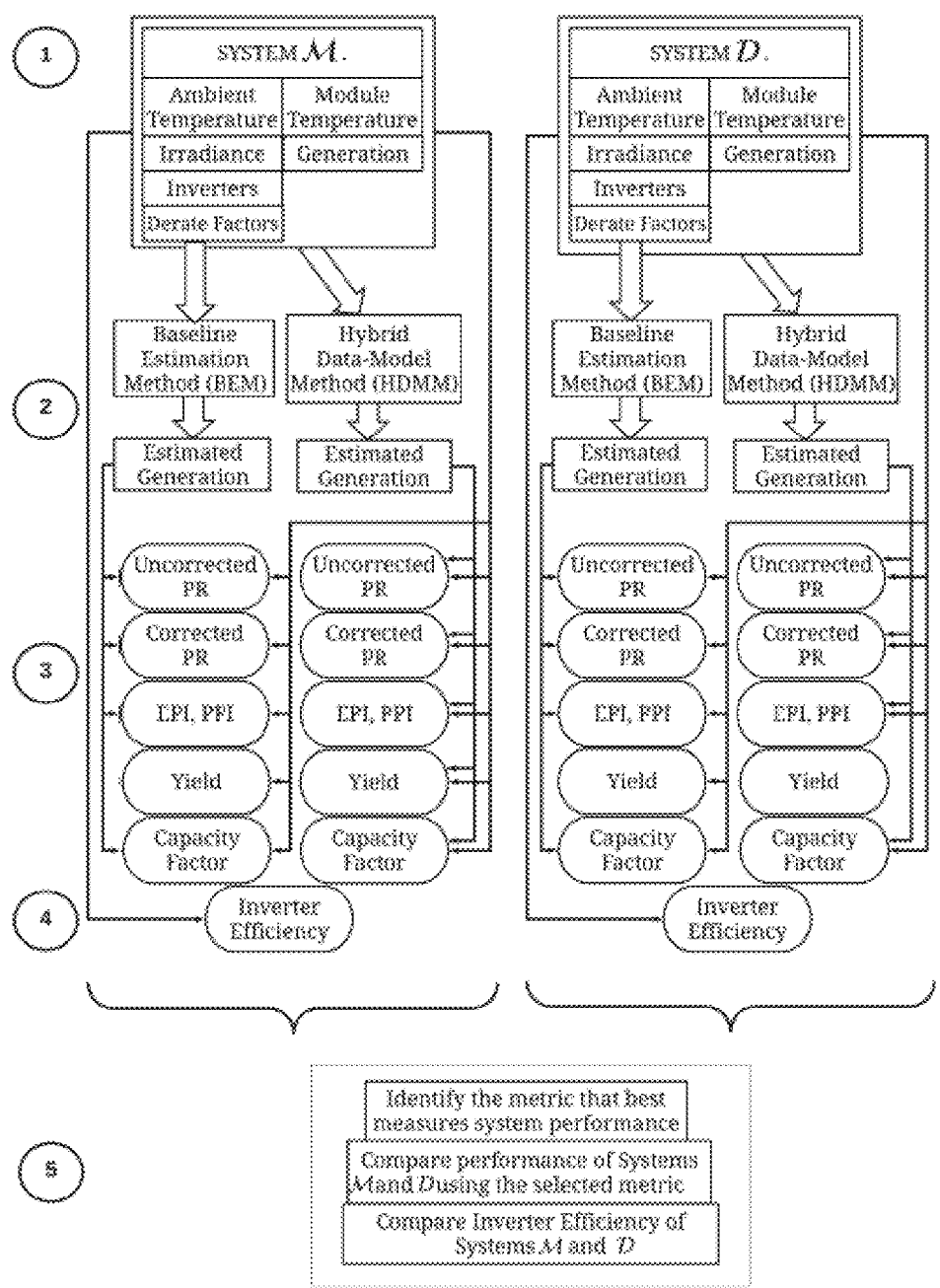
FIG. 6 shows a flowchart summarizing a five-step methodology starting with data acquisition at Step 1 and delivering of results at Step 5.

A five-step methodology was used to estimate PV generation. As shown in FIG. 6, this methodology has the following steps: (1) acquire time-series data for each system (weather, inverter production, derate factors, and system generation); (2) feed weather, historical data and model information into a baseline estimation method (BEM) and the proposed hybrid data-model method (HDMM) to get two sets of estimated generation values for each PV system; (3) use the observed and estimated generation to compute different performance evaluation metrics (uncorrected PR, PR corrected to STC, PR corrected to average module temperature, monthly energy performance index (EPI), monthly average yield, instantaneous power performance index (PPI), and monthly average capacity utilization factor); (4) compute efficiency of different inverters installed at the system; and (5) repeat steps (1) through (4) for all systems and identify the metric that best captures each system's performance. Using that metric, compare the individual system performances, and the aver-age efficiency of inverters at these systems. They were used to determine the system with a better performance overall, and finally findings were documented as a report to the concerned party that could be the system owner, installer, aggregator, end-consumer, or the utility.

Figure 7:
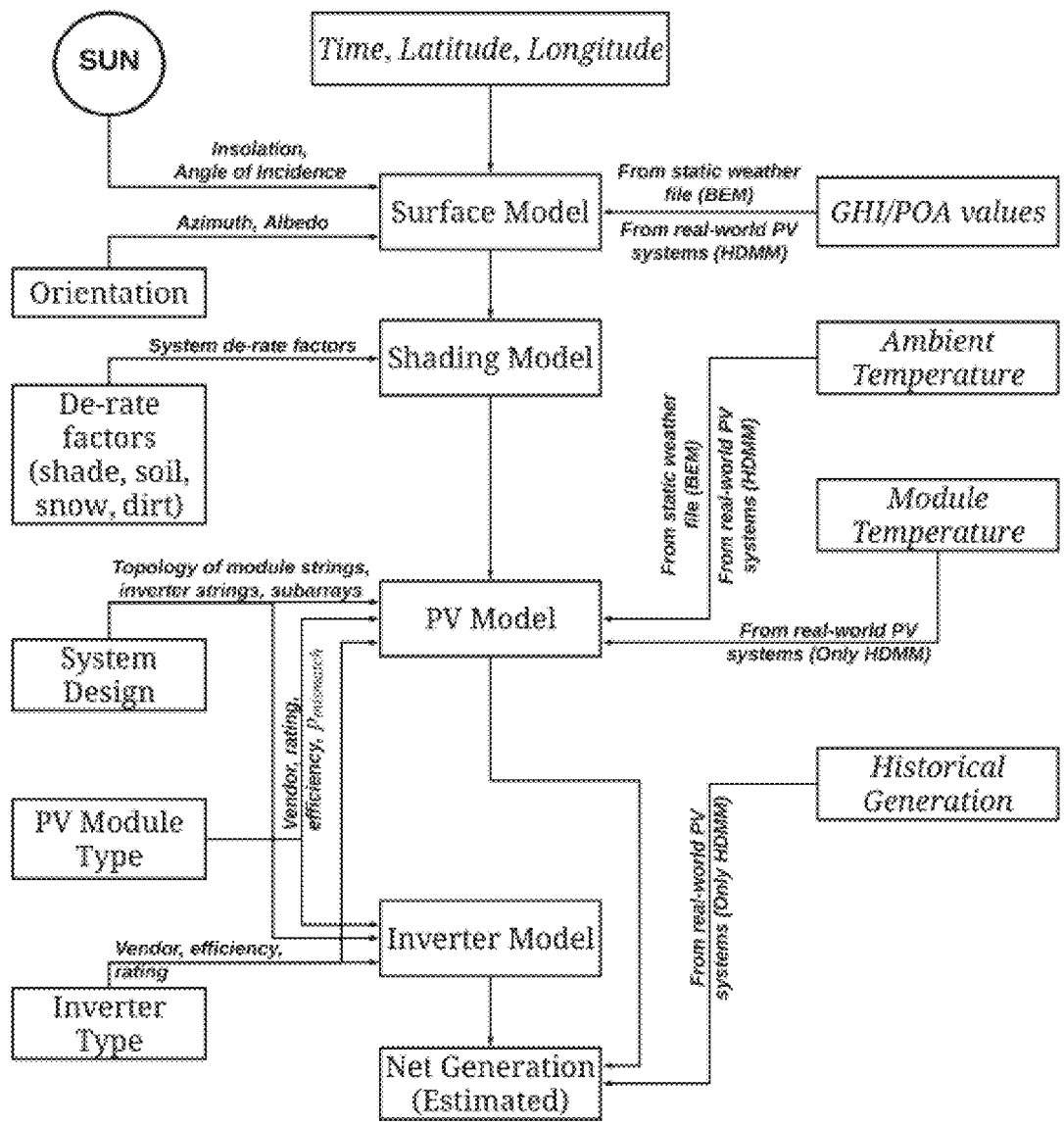
FIG. 7 shows a flowchart summarizing how HDMM and BEM differ in the inputs they require for estimating PV generation.

Two methods are used to estimate PV generation. The inputs required by the two methods are illustrated in FIG. 7, which can also be used to intuitively compare how they differ in their approach. The BEM is developed using industry-accepted methods for modeling irradiance, derate factors, PV modules, inverters, and the system topological design. It uses static weather data from the file and does not consider module temperature and historical generation as part of its calculations.

However, HDMM of embodiments of the subject invention uses, in addition to the aforementioned inputs, also the system-specific field-measured historical time-series data on system generation, local weather, and PV module temperature. It, hence, is a hybrid technique that uses both model information as well as real-world data to make its estimations. These two estimation methods are also plotted against the observed generation to understand how responsive they are to the fluctuations in generation. Before elaborating the two estimation methods, the methodology to estimate PV production is briefly explained below.

PV system performance is affected by different parameters such as irradiance and temperature (ambient and module), inverter efficiency, derate factors, and additional factors such as wind speed, wind direction, and instantaneous cloud coverage. However, for this case study, the only parameters considered are irradiance, ambient temperature, module temperature, inverter efficiency, and derate factors (including losses).

Irradiance Computation:

To calculate the plane of array (POA) irradiance, defined as the total irradiance incident on the surface in the plane of the PV array and measured by a pyranometer, diffuse horizontal and direct normal irradiance values are used. The sky-diffused POA irradiance, defined as the energy scattered by atmospheric elements before reaching the system's PV array surface, alone is considered because of the manner in which the two systems are constructed, thereby also minimizing the losses because of soiling and shading.

PV module models: The performance model used for PV arrays is empirical but takes into account the equations derived from individual solar cell characteristics. It also includes the incorporation of the dependencies at STC of irradiance, solar availability, ambient temperature, and module temperature. It is a single-diode equivalent circuit model of the PV module, with a reference POA irradiance of 1 kW/m$^2$ and a reference cell temperature of 25° C. The details of this model's formulation can be found in King, et al. ("Photovoltaic array performance model," Sandia National Labs Technical Report, pp. 1-43, December 2004. [Online]. Available: https://prod-ng.sandia.gov/techlib-noauth/access-control.cgi/2004/043535.pdf; which is hereby incorporated by reference herein in its entirety).

Inverter Models:

An empirical model with manufacturer specifications that uses four derived coefficients and parameters from the CEC database is used to model the DC input and AC output for inverters. The inverter types are labeled M-Inv1 for System M and D-Inv1 through D-Inv8 for the eight different inverter types deployed at System D. Among these types, M-Inv1 and D-Inv5 belong to the same vendor, but have different nameplate ratings. Hence, they are treated as different types. The amount of AC power output from an inverter model, $kW_{AC}$, is given by:

$$kW_{AC} = \left[\frac{kW_{inverter}}{(a-b)} - c(a-b)\right](kW_{DC} - b) + c(kW_{DC} - b)^2 \quad (5)$$

$$a = kW_{DC\_level} \times (1 + \beta \times (V_{DC} - V_{DC\_level})),$$

$$b = kW_{self\_consumption} \times (1 + \gamma \times (V_{DC} - V_{DC\_level})),$$

$$c = \alpha(1 + \delta \times (V_{DC} - V_{DC\_level}))$$

where, $kW_{inverter}$ is the rated AC power output for the inverter at STC, $kW_{DC}$ is the DC input power feeding into the inverter from the PV modules, $kW_{DC\_level}$ is the DC power level corresponding to which the rated AC output is achieved by the inverter at STC, $V_{DC}$ is the DC voltage at the inverter's input terminal, $V_{DC\_level}$ is the DC voltage level corresponding to which the rated AC output is achieved by the inverter at STC, $kW_{self\_compensation}$ is the DC power that is consumed by the inverter and is a factor influencing the efficiency, is the curvature parameter describing the relationship between AC and DC power values at STC, β is the empirical coefficient that lets $kW_{DC\_level}$ vary linearly with respect to $V_{DC}$, γ is the empirical coefficient that lets $kW_{self\_compensation}$ vary linearly with respect to $V_{DC}$, and a is the empirical coefficient that lets a vary linearly with respect to $V_{DC}$.

The Input Data:

Taking a static weather file as input, along with model information on the inverters, PV modules, system parameters and topological characteristics (number of arrays, number of strings per array, number of modules per string, tilt, azimuth, square footage, etc.), and derate factors, BEM is capable of computing the system's AC output for a period of one year.

Given PDC is the nameplate capacity of the PV system and $I_r(t)$ is the irradiance recorded at time-step t, the expected power at t, $P_{estimate}(t)$, and energy, $E_{estimate}$, for each month (N=2,688 values for February, N=2, 976 for 31-day months, and N=2, 880 for 30-day months, assuming no missing values), are computed using Eq. (6), considering 15-minute time-steps:

$$P_{estimate}(t) = P_{DC} \times \frac{Ir(t)}{1000} \times X \times D_f \quad (6)$$

$$E_{estimate} = P_{DC} \times X \times D_f \times \sum_{t=1}^{N} \frac{Ir(t)}{1000}$$

where Df is the net derate factor computed using Eq. (8) that takes dirt ($p_{dirt}$), cabling loss ($p_{cable}$), and inverter's conversion loss captured by its efficiency ($p_{inverter}$). PV module mismatch factor is computed using Eq. (7) where $P_{panel}$ is the maximum wattage of the PV module and $P_{MPP}$ is the maximum power point wattage of that module:

$$p_{mismatch} = \frac{P_{panel} - P_{MPP}}{P_{MPP}} \quad (7)$$

$$D_f = p_{dirt} \times p_{mismatch} \times p_{cable} \times p_{inverter} \quad (8)$$

The variable X in Eq. (6) is used to improve the accuracy of the estimation and considers two parameters: the PV module temperature at time-step t, T(t), and the PV module temperature coefficient, $\%_{tempcoeff}$, measured in %/° C. When X=1, it is an uncorrected estimation. To consider the effect of T(t) and correct the estimation to 25° C. at STC, X should be:

$$X = 1 + \frac{\%_{tempcoeff}}{100}[T(t) - 25] \quad (9)$$

PR can further be corrected to average module temperature ($T_{module_{avg}}$) have X set to [59]:

$$X = 1 + \frac{\%_{tempcoeff}}{100}[T(t) - T_{module_{avg}}] \quad (10)$$

This calculation averages all 15-minute data points over the year of 2017. It has been shown that the accuracy of estimation is maximized when T(t) is corrected instead to the average cell temperature and wind speed.

Many metrics can be used to evaluate PV system performance. While uncorrected PR, measured using Eq. (11), is widely used by the utilities to measure the performance of a particular PV system, it is highly dependent on local weather (especially module temperature) and hence varies significantly over the course of a year. Therefore, PR is not an effective metric to compare performance of two PV systems that experience different weather conditions. For the below series of equations, consider $kWhAC_{actual}$ to denote the observed energy (in AC side) generated by the PV system, PDC to denote the name-plate rated generation capacity (DC side) of the PV system, and $kWh_{sun}$ to denote the amount of solar energy received by the PV system cumulatively across its entire area. Then, the uncorrected PR is calculated by:

$$PR = \frac{\frac{kWhAC_{actual}}{P_{DC}}}{\frac{kWh_{sun}}{1000}} \quad (11)$$

Embodiments of the subject invention can also consider yield (PV systems of different sizes are not directly comparable), PR corrected to STC (PV systems employing different PV models are not directly comparable), and capacity factor (ratio of the observed PV generation over a time period to its potential generation if it functioned at its full nameplate capacity continuously over the same time period). Given a time instance t in N total number of time instances and the observed generation (in kW) from the PV system at the time t denoted by $kWAC_{actual}(t)$, the yield, PR corrected to STC, and capacity factor are calculated as follows:

$$Yield_{monthly} = \frac{\sum_{t=1}^{N} kWhAC_{actual}(t)}{P_{DC}} \quad (12)$$

$$PR_{corrected} = \frac{\frac{kWhAC_{actual}}{P_{DC}}}{\frac{kWh_{sun}}{1000}} X \quad (13)$$

$$CapFac_{monthly} = \frac{\sum_{t=1}^{N} kWhAC_{actual}(t)}{N \times P_{DC}} \quad (14)$$

Among them, yield is considered to be more of a measure of PV system value than performance, and capacity factor is regarded as a measure of the system's utilization than efficiency or performance. Another set of metrics, the EPI and PPI, are also defined as follow, where $P_{estimate}(t)$ and $E_{estimate}$ are obtained from Eq. (6):

$$PPI(t) = \frac{kWhAC_{actual}(t)}{P_{estimate}(t)} \quad (15)$$

$$EPI = \frac{kWhAC_{actual}}{E_{estimate}} \quad (16)$$

From Eq. (15) and Eq. (16), it can be seen that EPI is an aggregate metric while PPI is instantaneous. Consequently, EPI can be used to compare performance of two systems over a longer period of time (months or years) while PPI for shorter periods of time (hours or days). These metrics are better to compare the performance of different PV systems because they can correct the estimation to average module temperature to account for local variations and they are independent of the PV model.

The results can be discussed by first applying HDMM and BEM to the two PV systems to determine which method shows better accuracy with respect to the observed generation. Following that, the better performing estimation method can be used to compute different performance metrics and evaluates the advantages of each metric. Finally, the efficiency of different inverter vendor products can be compared to determine the best model for this time period. Note that the months of August through October are excluded from comparison purposes because of the unforeseen changes induced by Hurricane Irma.

Figure 8A:
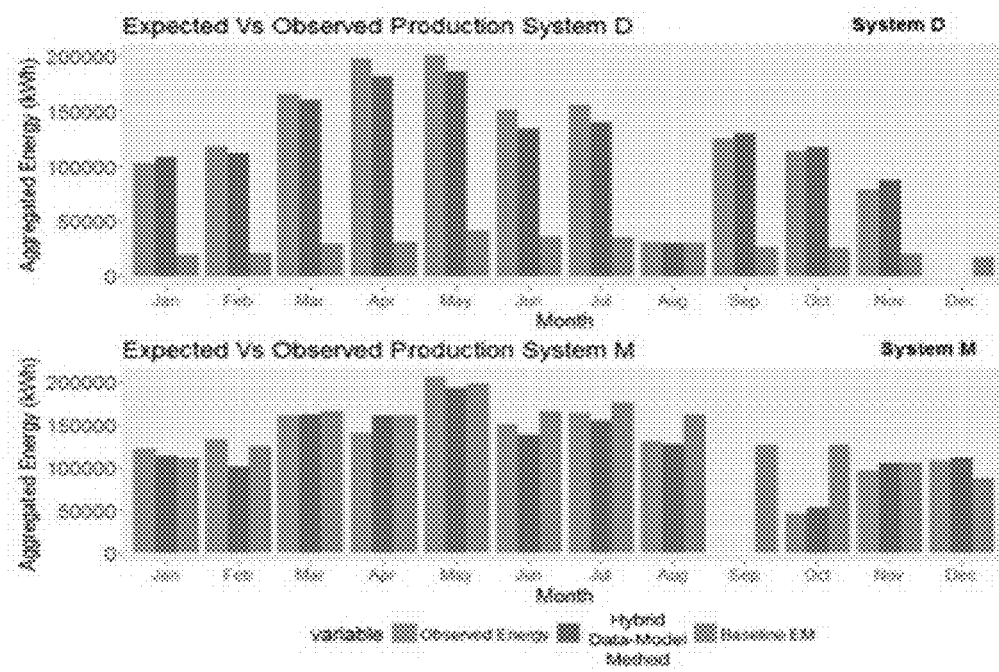
FIG. 8(a) shows estimation of the generation of Systems M and D, estimated using HDMM and BEM, along with a comparison against observed generation.
Figure 8B:
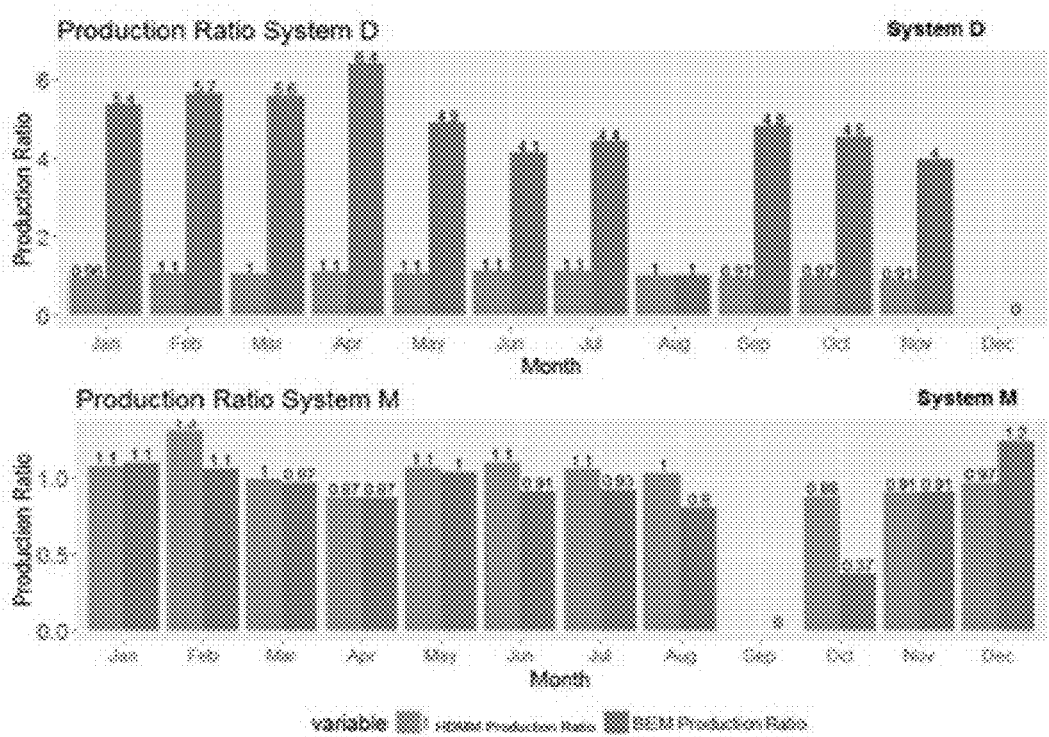
FIG. 8(b) shows a comparison of the accuracy of HDMM and BEM, compared using production ratio.

It can be seen from FIG. 8a that HDMM is more responsive to fluctuations in generation when compared to the statically modeled BEM that fails to account for the dynamic fluctuations. Specifically, the absolute margin of error between the two estimation methods and the observed generation, is given in the first two rows of Table 4. With BEM a fully model-based approach but HDMM also utilizing real data in addition to model parameters, the latter performs better. This is further proven in FIG. 8b which shows the production ratio for both systems, computed as the inverse of EPI from Eq. (16). Ideally, the estimated and observed generation values should be equal, thereby making the production ratio 1. Allowing for real-world inaccuracies, the margin can be relaxed to 1±0.2. BEM has an average production ratio of 0.92 for System M that is comparable with that of HDMM (1.03). However, BEM does poorly for System D with an average production ratio of 4.6 as a result of the high error between estimated and observed values. HDMM, on the other hand, still has a good average production ratio of 1.03 for System D. Therefore, the HDMM fares better than the strictly model-driven BEM. This conclusion is further validated by the different standard statistical indicators such as the root mean square error (RMSE), mean square error (MSE), and mean absolute error (MAE), each of which are shown in Table for Systems M and D. The error measures have a large magnitude in part because the estimated energy generation values for each month were computed by aggregating the estimated values of individual timestamps. Since energy is merely regarded as the power production over a period of time, this also led to the propagation of errors. However, between HDMM and BEM for both systems, it can be seen that HDMM has minimal error measures, and hence, demonstrates that its predicted values are closer to the observed values.

Figure 10:
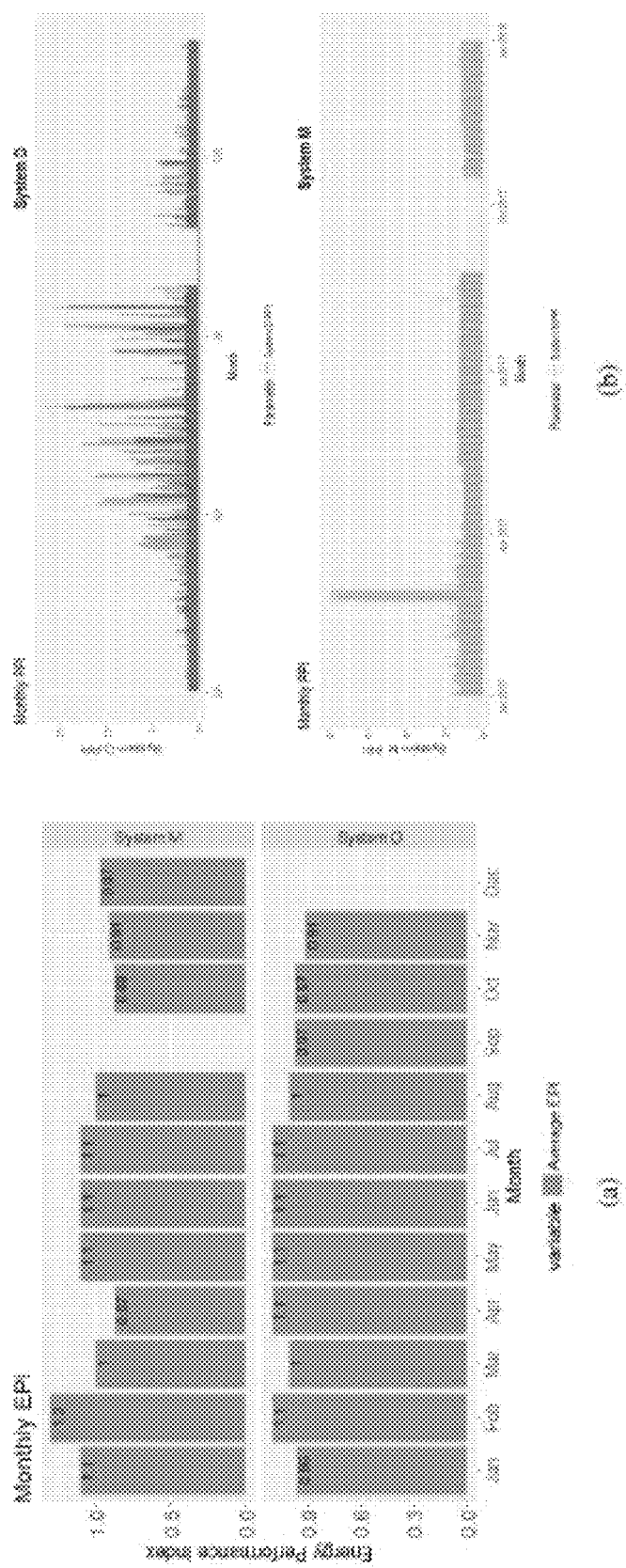
FIG. 10 shows recommended metrics: (a) the average monthly EPI for two systems; and (b) the instantaneous PPI values for the two systems.

When considering EPI and PPI, shown in FIGS. 10a and 10b respectively, it should be noted from Eq. (16) and Eq. (15) that the estimated generation goes at the denominator. Hence, a value>implies that the system's actual generation was better than the estimated one, so it is the instances where the values go lower than 1 (observed generation is below expected generation) where planners and system users must divert more attention. Table 4 also documents the frequency of occurrences where EPI and PPI were >1. Certain outliers can also be observed in FIG. 10b where the PPI values are exceptionally high. These outliers were checked to discover that HDMM performed poorly on those specific dates because of the anomalies in weather (heavy rainfall or intense cloud coverage).

TABLE 3

Error Measures for HDMM and BEM Against Observed Generation

| Error Measure | Method | System D | System M |
|---|---|---|---|
| Root mean square error (RMSE) | BEM | 1.07e+05 | 4.54e+04 |
| | HDMM | 9911 | 1.32e+04 |
| Mean square error (MSE) | BEM | 1.14e+10 | 2.06e+09 |
| | HDMM | 9.82e+07 | 1.75e+08 |
| Mean absolute error (MAE) | BEM | 9.52e+04 | 2.89e+04 |
| | HDMM | 8029 | 9.98e+03 |

TABLE 4

A Table of Observed Results

| Observed Parameter | System D | System M |
|---|---|---|
| Average absolute error between HDMM and observed generation | 6% | 8% |
| Average absolute error between BEM and observed generation | 72% | 38% |
| Magnitude of variation in uncorrected PR | 0.19 | 0.37 |
| Magnitude of variation in PR corrected to STC | 0.15 | 0.21 |
| Magnitude of variation in PR corrected to average module temperature | 0.19 | 0.30 |
| %-share of PPI ≥ 1 | 46% | 41.96% |

Figure 9:
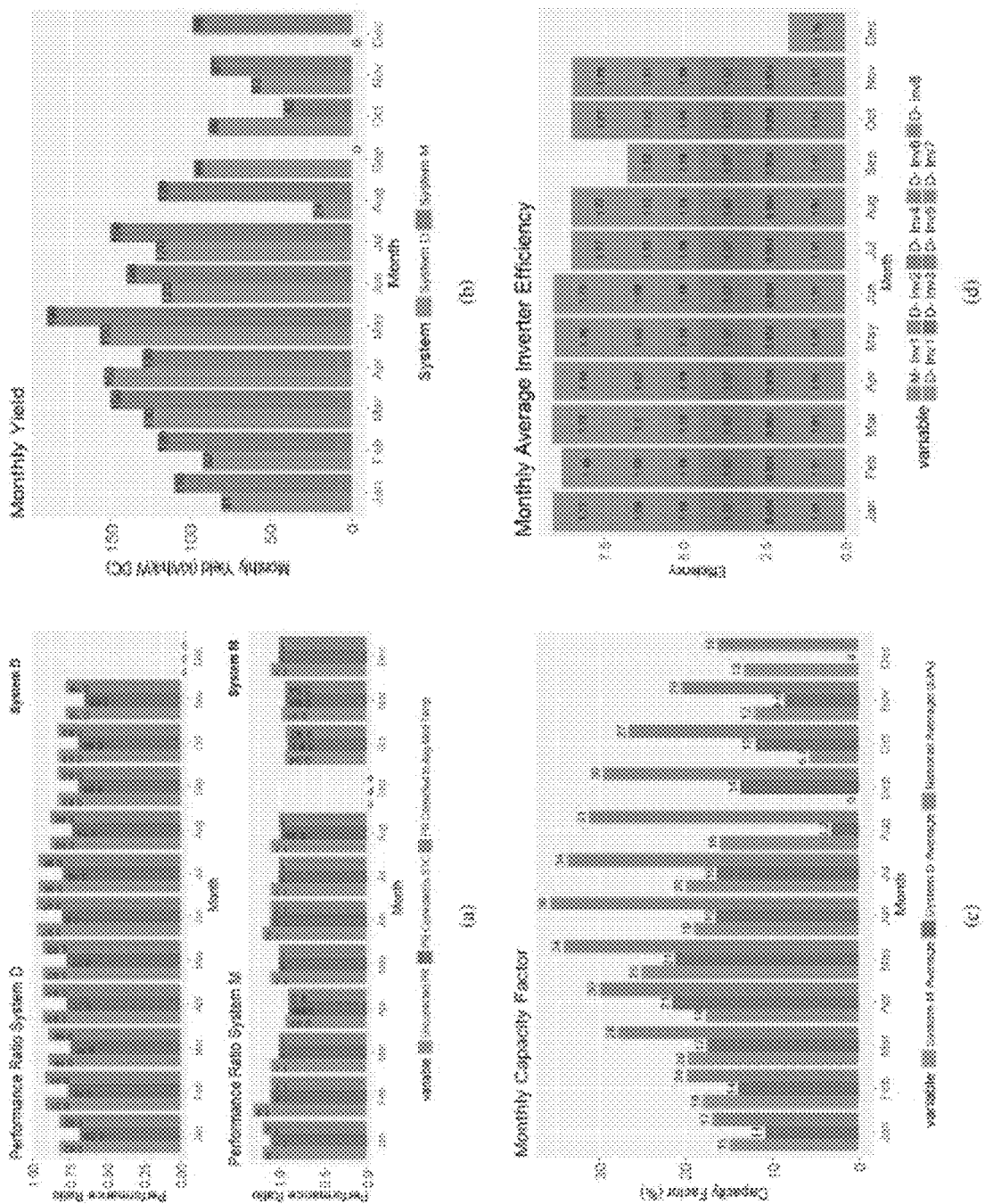
FIG. 9 shows different performance metrics for two systems: (a) the uncorrected PR, PR corrected to STC, and PR corrected to average module temperature; (b) the average monthly yield; (c) the average monthly capacity factor; and (d) the average monthly inverter efficiency for the different inverter models of the two systems.

From FIG. 9d, the efficiencies of different inverter models can be seen. The efficiency values for most models are documented to be more than 1, which is not possible practically or theoretically. However, this anomaly has been confirmed with the local utility partner to be an issue in the systems' DASs, and hence an error in computation can be ruled out. This anomaly can be addressed more systematically by comparing the inverter productions recorded by the DASs with the systems' onsite system controllers. The goal of comparing efficiencies of different inverter models is to understand which model has performed better in the year on an average. This could give the system installers, owners such as utilities, and individuals an initial idea of which model is more effective for that location and system size. Based on current analysis, it is not straightforward to determine the better performing model since conversion efficiency alone is not enough. However, given that System D is composed of 8 different models of string inverters whereas System M has only 1 model, one hypothesis to explain the better overall performance of System M could be the inverter model homogeneity. Other factors such as service downtime, inverter component reliability, and studying the impact of external weather factors on the inverter lifecycle would be equally important.

Considering the case study of two grid-tied PV systems, M and D, their generation profiles for the year of 2017 were estimated using a strictly model-driven BEM and the proposed HDMM that uses the model-driven approach with real system data (generation and weather). This is discussed in detail above. The results show that HDMM had a better estimation accuracy than BEM for both systems. This can be seen from the relatively lower error measures for HDMM, and also from the average production ratios. For System D, production ratio calculated using HDMM averaged at 1.028, while it was 4.618 with BEM. The corresponding values for System M were 1.03 and 0.924. Following this conclusion, HDMM was used to compute different PV performance metrics. Correcting PR to average module temperature reduced the variability of the metric by 26% for System M and by 57% for System D, making it less influenced by seasonal changes. Metrics such as yield and capacity factor do not measure system performance but can be useful in characterizing the system behavior. The side-by-side comparison of yield and capacity factor shows that System M utilized its net generation capacity better than System D. Considering they have comparable nameplate generation capacities, the choice of inverter models is considered. The average monthly conversion efficiency of the different inverter models deployed at the two systems were compared. Although further analysis is required to understand the reason behind all inverter models reporting efficiencies greater than unity, it was observed that a majority of the models showed little to no change in their production efficiencies over the year. EPI and PPI, however, are the recommended metrics that can be used to compare performances of the two systems. Although the fluctuations in the EPI across the months was greater for System M, the PPI values were most consistent for this system, implying that a given point of time, it is more likely that the production of System M is better than that of System D.

Further embodiments could focus on one or more of the following: (a) measuring PR corrected to average PV cell temperature and wind speed to determine whether it resolves the issue of PR variability; (b) studying the anomalies observed in inverter efficiency values by comparing the data from DASs and that from inverter production aggregators located onsite; (c) expanding the study of inverter performance by considering other factors; and (d) studying how the anomalies in weather such as cloud coverage and poor irradiance can be modeled better into HDMM to ensure a more accurate estimation (thereby more accurate metrics).

Figure 11:
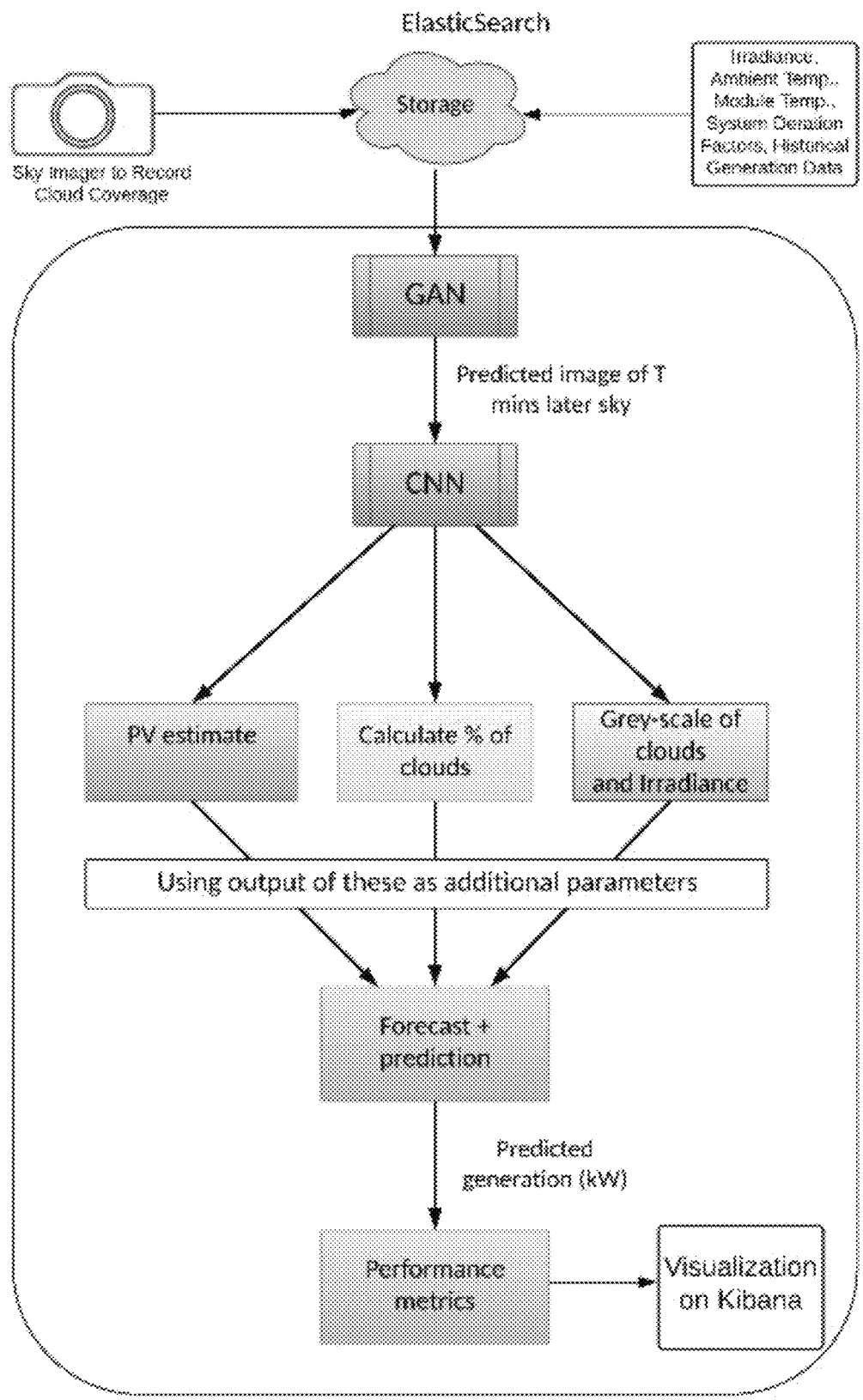
FIG. 11 shows a flowchart of interaction between modules, according to an embodiment of the subject invention.

In embodiments of the subject invention, a software package can be used and can comprise one or more of the following modules:
1. Image processing-driven cloud coverage detection using convolutional neural networks and computer vision, and forecasts of cloud cover % using LSTM-CNN;
2. A hybrid data-model method using historical generation and system-specific deration factors for numerically estimating PV generation;
3. SARIMA-based model to make univariate forecasts of irradiance, ambient temperature, module temperature, humidity, precipitation, and/or other weather parameters;
4. Parametric regression that takes results from Module 3 and give regression model outputs correspondingly;
5. MLP-PSO based model to take outputs from Modules 1, 2, and 4 as features to predict correspondingly the value of PV generation; and/or
6. The use of EPI and PPI to evaluate and compare performances of PV systems The interactions between modules 1-5 above are shown in FIG. 11 and use the following time-series datasets as inputs:
1. Sky Imager
   a. 5 to 10-minute sky images recorded from the 1.4 MW PV system
2. Satellite Images
   a. 5-minute images of the cloud tops, water vapor, brightness index from satellite (ongoing)
3. AlsoEnergy
   a. 1-minute resolution Irradiance (W/m2) from 1.4 MW PV system (3+ years: e.g., August 2016 to August or September 2019)
   b. 1-minute ambient temperature (F) from 1.4 MW PV system (3+ years: e.g., August 2016 to August or September 2019)
   c. 1-minute PV module temperature (F) from 1.4 MW PV system (3+ years: e.g., August 2016 to August or September 2019)
   d. 1-minute generation (kW) from 1.4 MW PV system (3 years: e.g., August 2016 to August or September 2019)
4. Weather Station
   a. 16-second resolution data from weather station measuring irradiance, ambient temperature, module temperature, humidity, precipitation, wind speed, wind direction Module 1: Image processing-driven cloud coverage detection and forecasting
Inputs: Sky-camera cloud images (1-minute)
Outputs: % of cloud coverage, predicting cloud position and irradiance for next five minutes
(1-minute resolution)
Models: GAN, LSTM-CNN
Platform: Python A 3-step algorithm can be used to detect the cloud coverage using the images captures from a wide-angle camera placed at the elevation of the PV system. Separately, using satellite imagery, cloud movement and imminent local cloud formations can be derived. Explanations of the 3 steps for the image series processing for ground-based camera are given as:

Step 1: Detecting Sun in the Picture

Convolutional Neural Networks (CNN) can be used to detect if there is a sun in the picture or not. Sub-part of step 1 is to cover the sun, if it exists, with black so that it is not mistaken as a cloud in next step.

Step 2: Detecting Type of Sky from 3 Predefined Types

Figure 12:
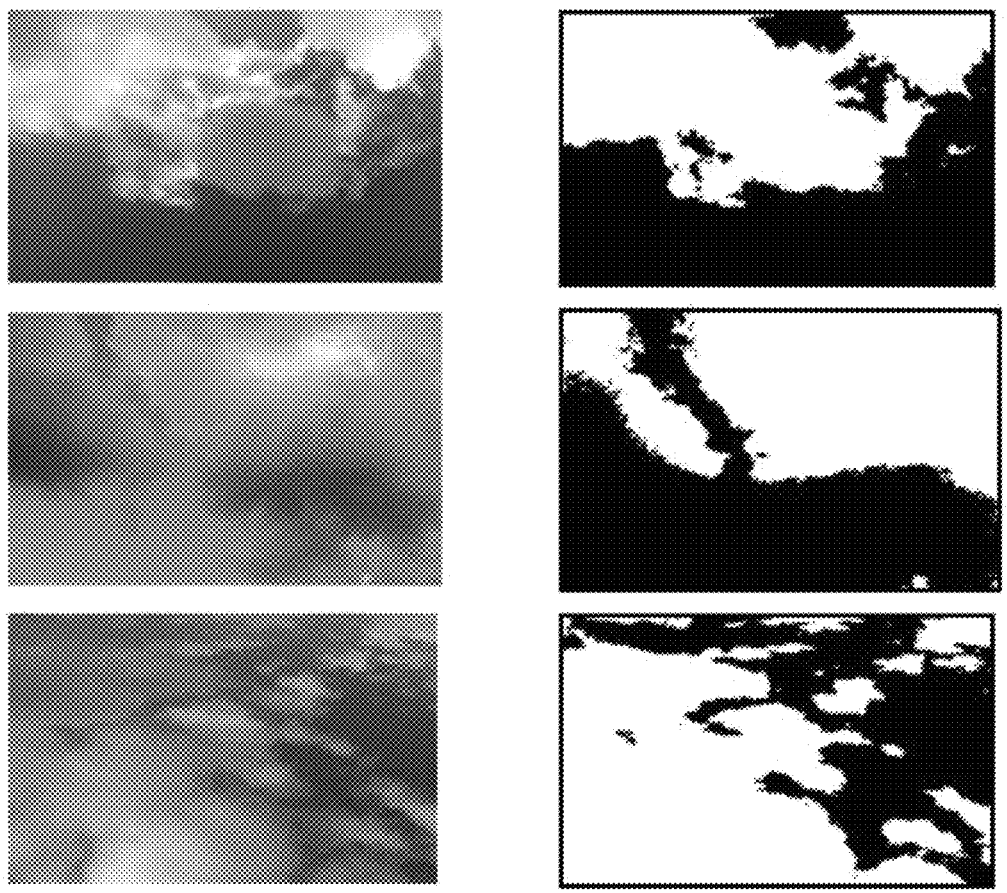
FIG. 12 shows images of the sky (left side) and corresponding black/white generated images (right side) of the sky images.

In this the image is classified as one of the three types (see also FIG. 12):
1. Sunny/Mostly Clear;
2. Overcast/Fully Covered; or
3. Partially Cloudy (or just Cloudy).

This helps in the next step; if it is sunny, it can just be concluded that it is sunny, but if it is overcast or partially cloudy, specific actions should be performed in the third step.

Another CNN can be used. For example, it can be trained on 448 mixed images for 3 classes having an accuracy of 0.964. Confusion matrix is given in FIG. 13(a).

Step 3: Percentage of Coverage

If the output of Step 2 is "Cloudy", a K-means cluster can be used to divide the pixels into two classes ['sky', 'cloud'] (see also FIG. 13(b)). The ratio of cloud vs total can give the percentage of cloud coverage. K-means can be used because labeled data with cloud coverage is not available; if it is available, predicting generation can be used and the percentage of coverage can be based of previous data, in which case more advanced supervised learning models can be used. If the output of Step 2 is "Overcast" the shade of the grey can be calculated, which can help in regression over the PV generation (see also FIGS. 13(c) and 13(d)).

Figure 14:
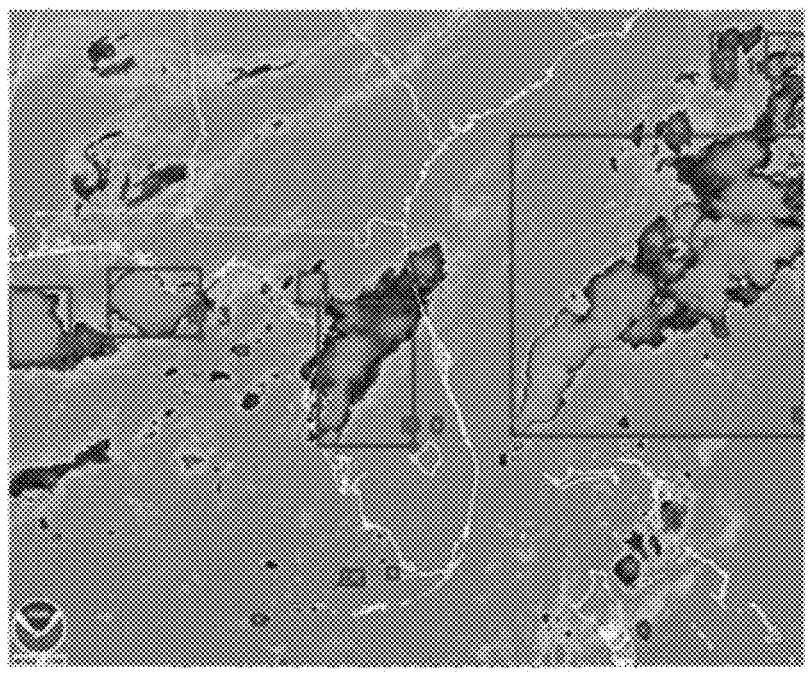
FIG. 14 shows an image of satellite imagery with clouds.

Referring to FIG. 14, for the satellite imagery, an overhead view of the cloud formation in large geographical areas is realized. Using the series of images from GOES-16 the direction and area of cloud formations in the region can be calculated. By placing the location of the PV system into the algorithm it is possible to determine an estimated time of arrival of large cloud formations over the PV system; however, the stochastic nature of cloud formations makes accuracy of time of arrival vary. This approach does give information which can be used for further in time-based PV power and energy forecasting.

Module 2: Estimating PV generation using a hybrid data-model method
Inputs: irradiance, module temperature, deration factors, DC nameplate capacity, average module temperature
Outputs: estimated PV generation
Model: Hybrid Data-Model Method (HDMM)
Platform: R This method can employ the following fine-tuned equations to estimate the PV generation:

$$P_{estimate}(t) = P_{DC\_size} \times \left\{\frac{Ir(t)}{1000}\right\} \times \left\{1 + \frac{\%_{temp\_coef}}{100}[T(t) - X]\right\} \times p_{dirt} \times p_{mismatch} \times p_{cable\_loss} \times p_{inverter} \quad (17)$$

$$p_{mismatch} = \frac{P_{panel} - P_{MPP}}{P_{MPP}} \quad (18)$$

Tables 5-7 represent the different parameters used in Equations (17) and (18).

TABLE 5

| Definition | FIU PV System |
|---|---|
| Dirt deration factor | 0.9 |
| Module mismatch factor | 0.97 |
| Cable Loss factor | 0.99 |
| Maximum inverter efficiency | 0.98 |
| Temperature coefficient | −0.5 |
| DC system size of PV plant | 1104 |

TABLE 6

| Value of X | Method |
|---|---|
| 25 | Corrected to nominal temperature |
| Average Mod. Temp. | Corrected to average module temperature but not wind speed |
| Average Cell Temp., Wind Speed factored in | Corrected to wind speed too; most accurate form of measure |

TABLE 7

| Parameter | System M | System D |
|---|---|---|
| Location | Miami | Daytona |
| Latitude-Longitude | 25.76° N, 80.36° W | 29.18° N, 81.05° W |
| Elevation (ft) | 10 | 33 |
| Nameplate rating (MW) ($P_{DC}$) | 1.4 | 1.28 |
| AC Capacity (MW) | 1.104 | 1.035 |
| Number of inverters | 46 | 36 |
| Number of inverter models | 1 | 8 |
| CEC inverter efficiency ($p_{inverter}$) | 0.98 | 0.975-0.986 |
| Number of PV modules | 4,480 | 4,200 |
| Module efficiency (%) | 16.5 | 16.5 |
| Number of strings in series × number of arrays | 56 × 4 | 35 × 6 |
| Modules per string | 20 | 20 |
| Tilt, Azimuth of array | 5°, 268° | 5°, 268° |
| Soiling derate factor ($p_{dirt}$) | 0.9 | 0.9 |
| Cabling loss factor ($p_{cable}$) | 0.99 | 0.99 |
| Temperature coefficient ($\%_{temp_{coeff}}$) | −0.5 | −0.5 |
| Module mismatch factor ($p_{mismatch}$) | 0.97 | 0.97 |

Figure 15:
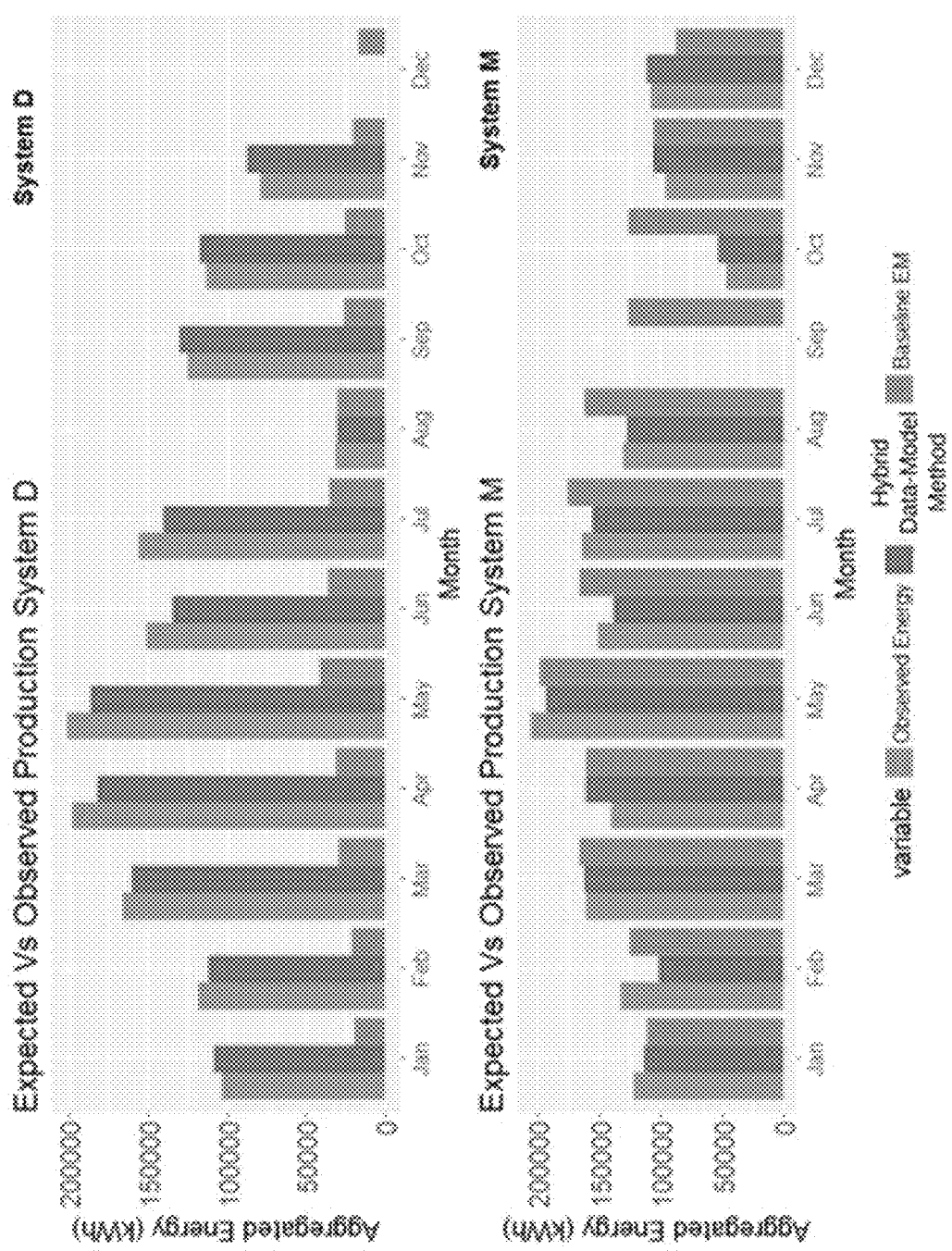
FIG. 15 shows preliminary results for System D (top) and System M (bottom) based on module 2.

FIG. 15 shows preliminary results for module 2.

Figure 16:
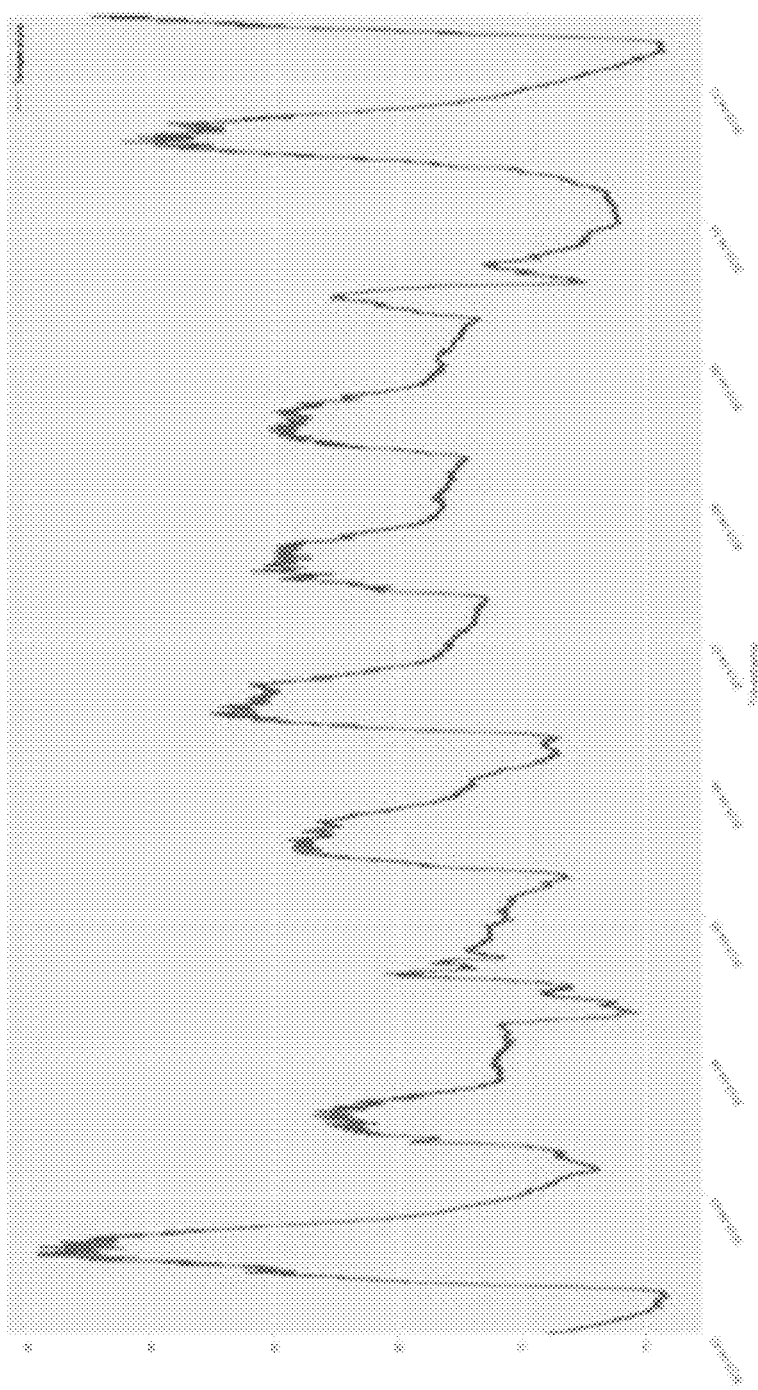
FIG. 16 shows a historical temperature graph.
Figure 17:
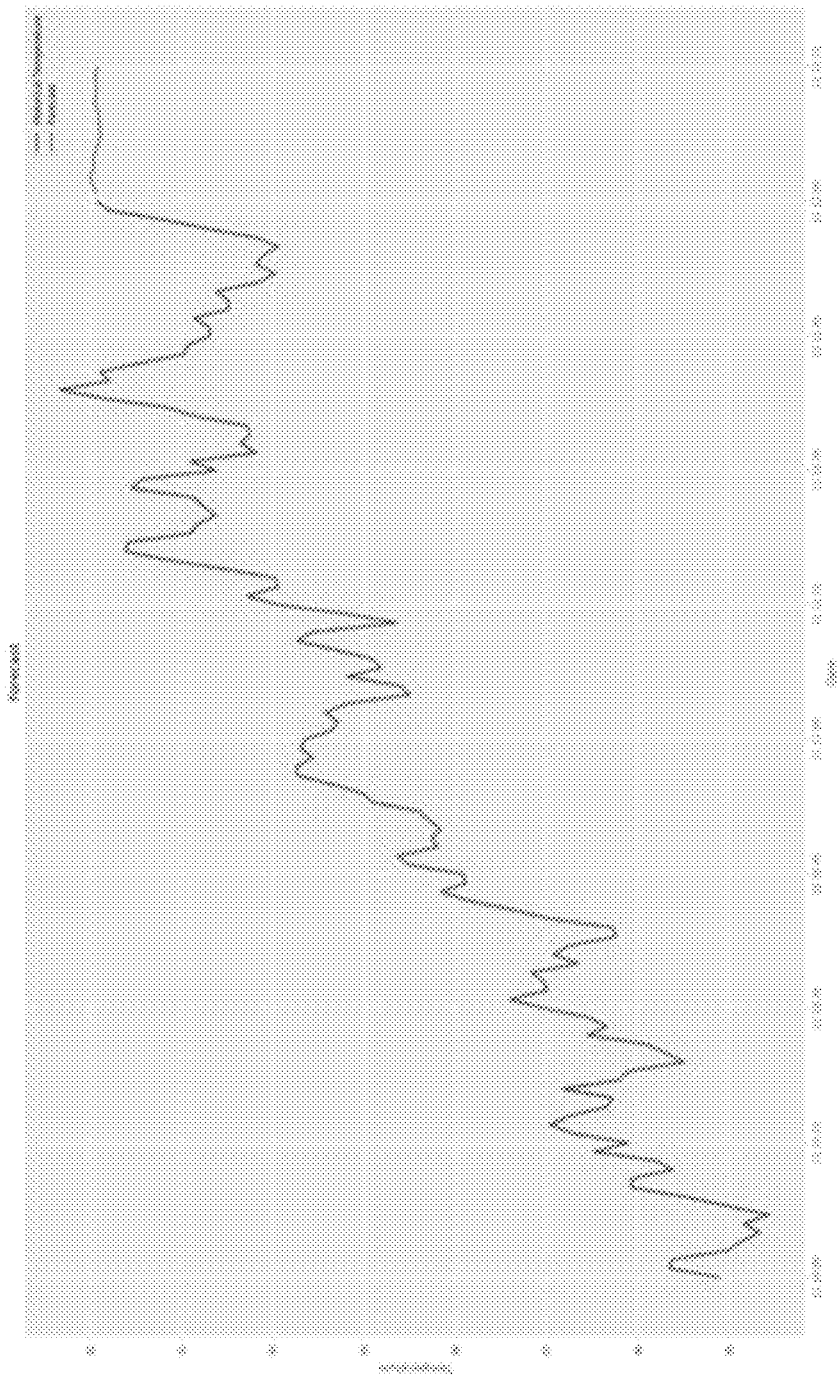
FIG. 17 shows a forecast temperature graph.
Figure 18:
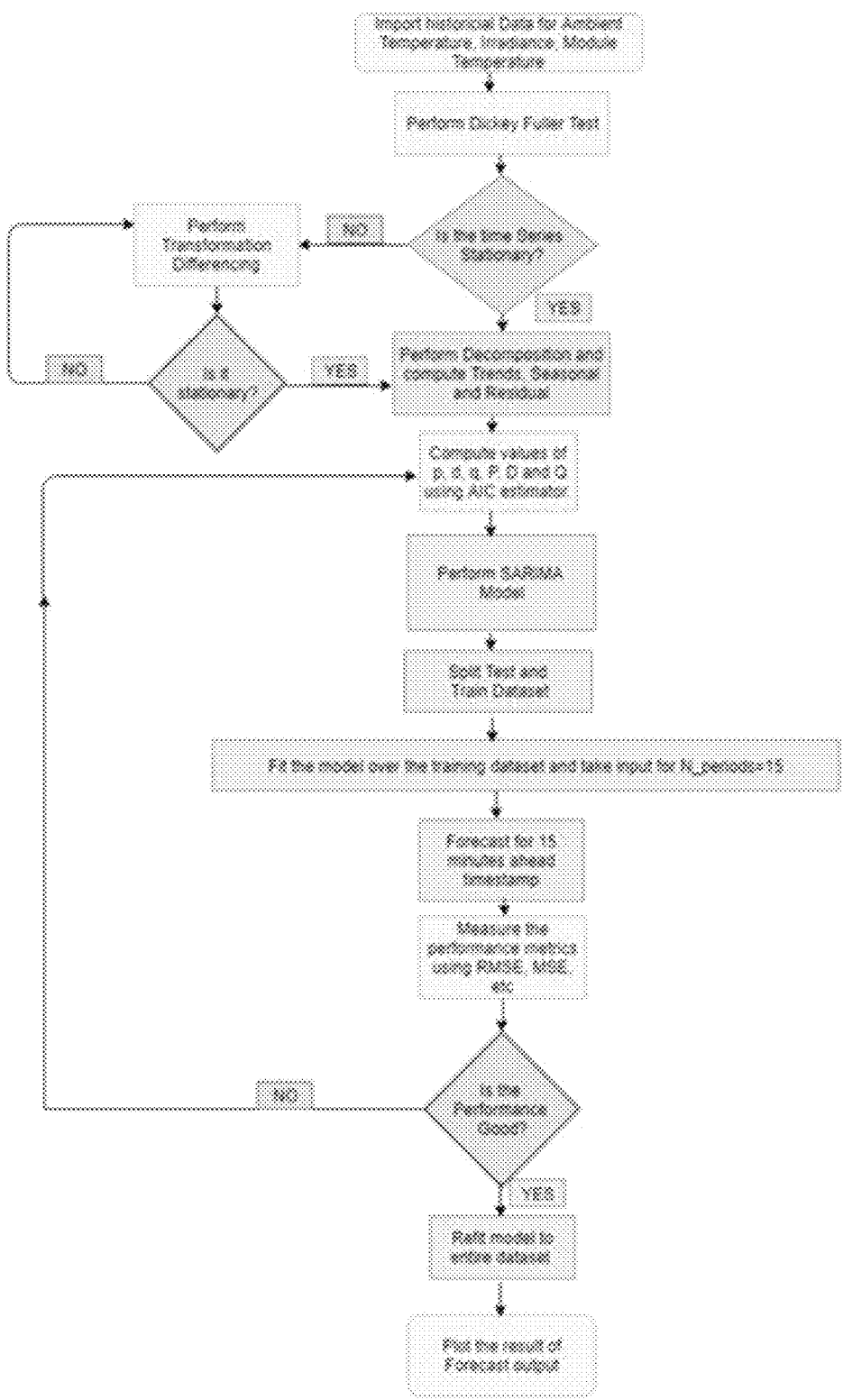
FIG. 18 shows a flowchart for SARIMA implementation.

Module 3: Forecasting Irradiance, Ambient Temperature, Module Temperature 15-minutes ahead
Inputs: historical irradiance, ambient temperature, module temperature
Outputs: 15-minute ahead forecasts of each parameter
Model: Seasonal autoregressive integrated moving average (SARIMA)
Platform: Python
Steps for Implementation:
1) Take input CSV for Module Temperature, irradiance, Ambient Temperature and convert the dataset to time series.
2) Check for stationarity of the time series using Dickey Fuller test
3) Use Decomposition to segregate the components Trends, Seasonal and Residual components for the input dataset.
4) Plot the Decomposition to segregate the components Trends, Seasonal and Residual
5) Calculating the values of p, d, q, P, D and Q using AIC estimator.
6) Performing Seasonal ARIMA over the on our input dataset.
7) Split train and test dataset.
8) Input N=15 in stepwise model for 15 minutes ahead prediction.
9) Training the model using the stepwise model. Fit over the train dataset.
10) Evaluating the efficiency of the forecasted dataset with the test dataset.
11) Concatenating the forecasted and original dataset for visualization.
12) Calculate and Print RMSE (Root Mean Square Error), MSE (Mean Squared Error)
13) Once the forecast model fits retrain the entire dataset and reform prediction for future values.
14) Plot the results of the forecast output 15 minutes ahead FIG. 16 shows a historical temperature graph (input); FIG. 17 shows a forecast temperature graph (output); and FIG. 18 shows a flowchart for SARIMA implementation.

Figure 19:
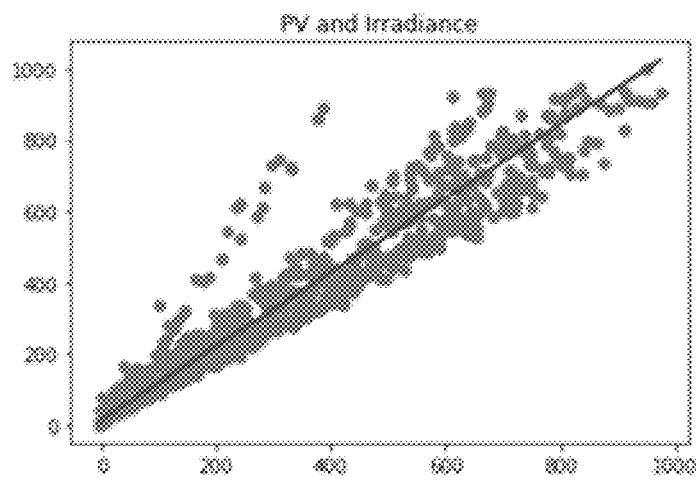
FIG. 19 shows linear regression between PV generation and irradiance.
Figure 20:
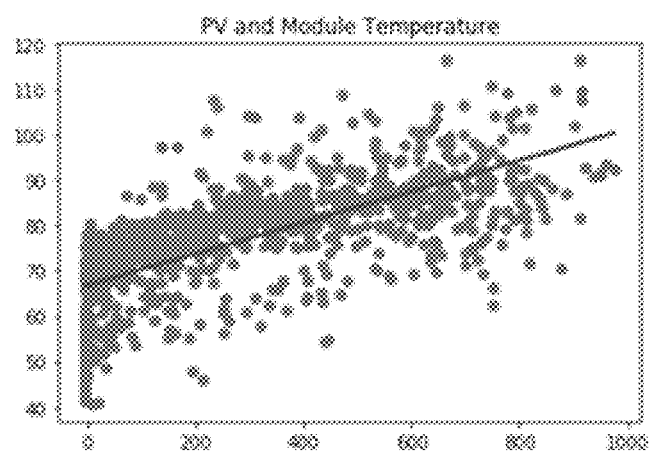
FIG. 20 shows linear regression between PV generation and module temperature.
Figure 21:
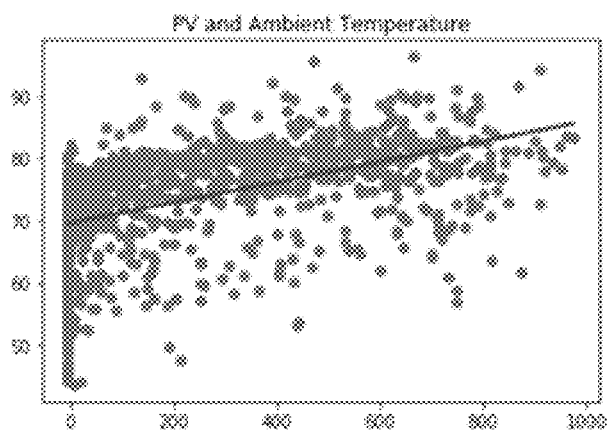
FIG. 21 shows linear regression between PV generation and ambient temperature.

Module 4: Parametric Regression to Determine Relationships between PV Generation and Other Parameters
Inputs: forecasts of irradiance, ambient temperature, module temperature, humidity, precipitation, cloud cover %
Outputs: PV generation values captured as a function of each input independently and/or in combination
Model: parametric regression with/without sensitivity analysis to determine degrees of importance
Platform: R/Python FIG. 19 shows linear regression between PV generation and irradiance; FIG. 20 shows linear regression between PV generation and module temperature; and FIG. 21 shows linear regression between PV generation and ambient temperature.

Module 5: PV Generation Prediction using MLP-PSO Model
Inputs: estimated PV generation from Module 2, PV generation values generated by the parametric regression models in Module 4
Outputs: predicted PV generation for 15 time steps ahead
Model: Multilayer perceptron trained using particle swarm optimization
Platform: MATLAB
Preliminary Results The model can take as features, e.g., irradiance, ambient temperature, and module temperature, to predict PV generation. The MLP model has 6 layers (3, 16, 12, 8, 4, 1 neurons, respectively). The number of particles is 12, and number of iterations is 1. The train-dev-test ratio is 80-10-10.
Training—RMSE: 45.6967, MSE: 2088.1844, MAE: 21.5763, R-Sq.: 0.9451
Test Dev—RMSE: 45.9036, MSE: 2107.1397, MAE: 23.8403, R-Sq.: 0.9070 Dev—RMSE: 45.2411, MSE: 2046.7564, MAE: 22.5678, R-Sq.: 0.9519

Figure 22:
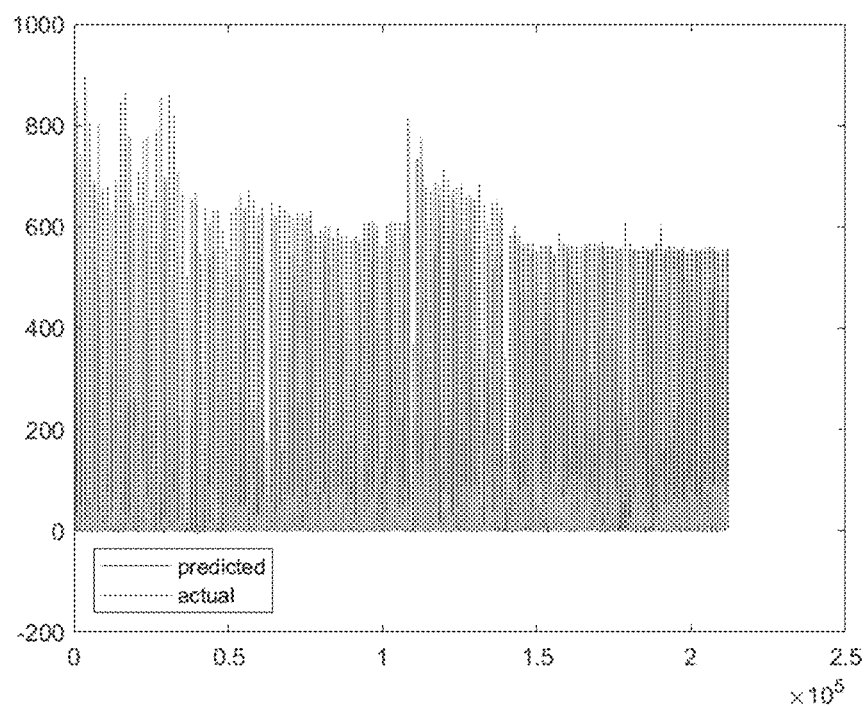
FIG. 22 shows a training set for module 5.
Figure 23:
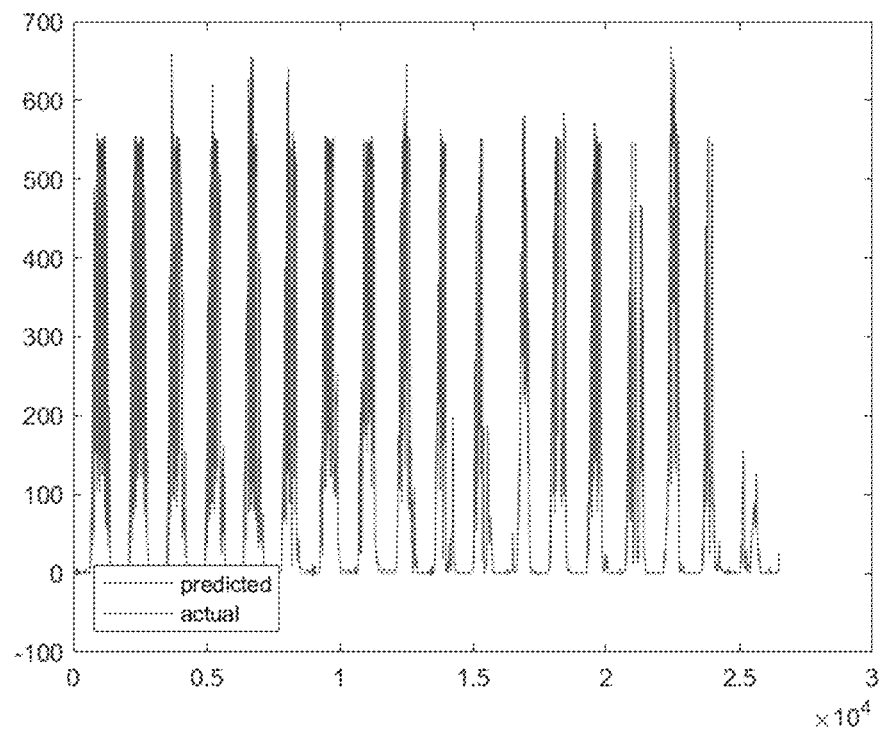
FIG. 23 shows a test development (TestDev) set for module 5.
Figure 24:
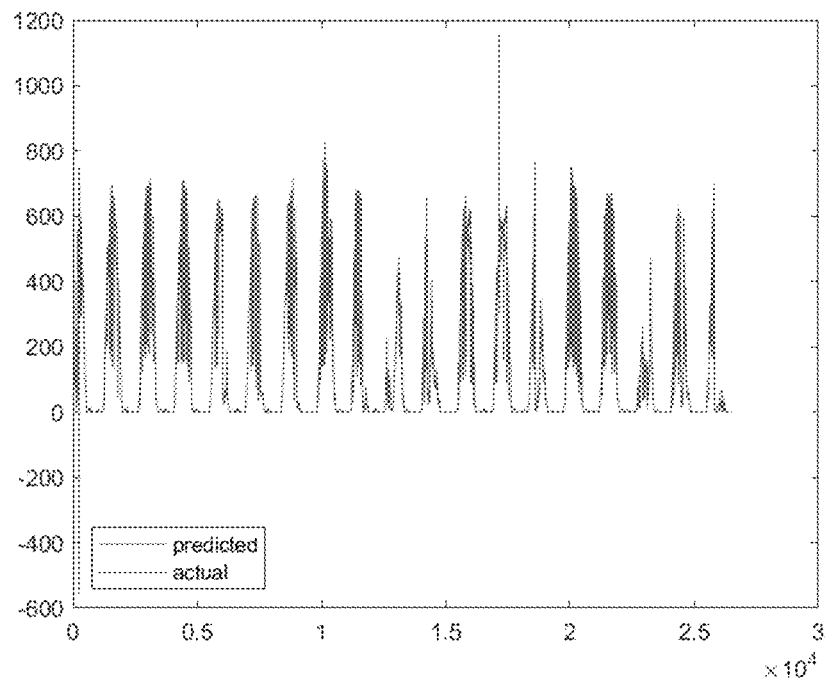
FIG. 24 shows a development (Dev) set for module 5.

FIG. 22 shows the training set; FIG. 23 shows the TestDev set; and FIG. 24 shows the Dev set.

Module 6: PV Performance Evaluation using EPI and PPI
Inputs: actual power and energy, forecast power and energy
Outputs: PPI and EPI values
Model: numeric calculation of the metrics
Platform: R PPI is the power performance index, used to measure instantaneous PV performance
EPI is the energy performance index, used to measure average PV performance $$PPI(t) = \frac{kWhAC_{actual}(t)}{P_{forecast}(t)} \quad (19)$$

$$EPI = \frac{kWhAC_{actual}}{E_{forecast}} \quad (20)$$

Figure 25:
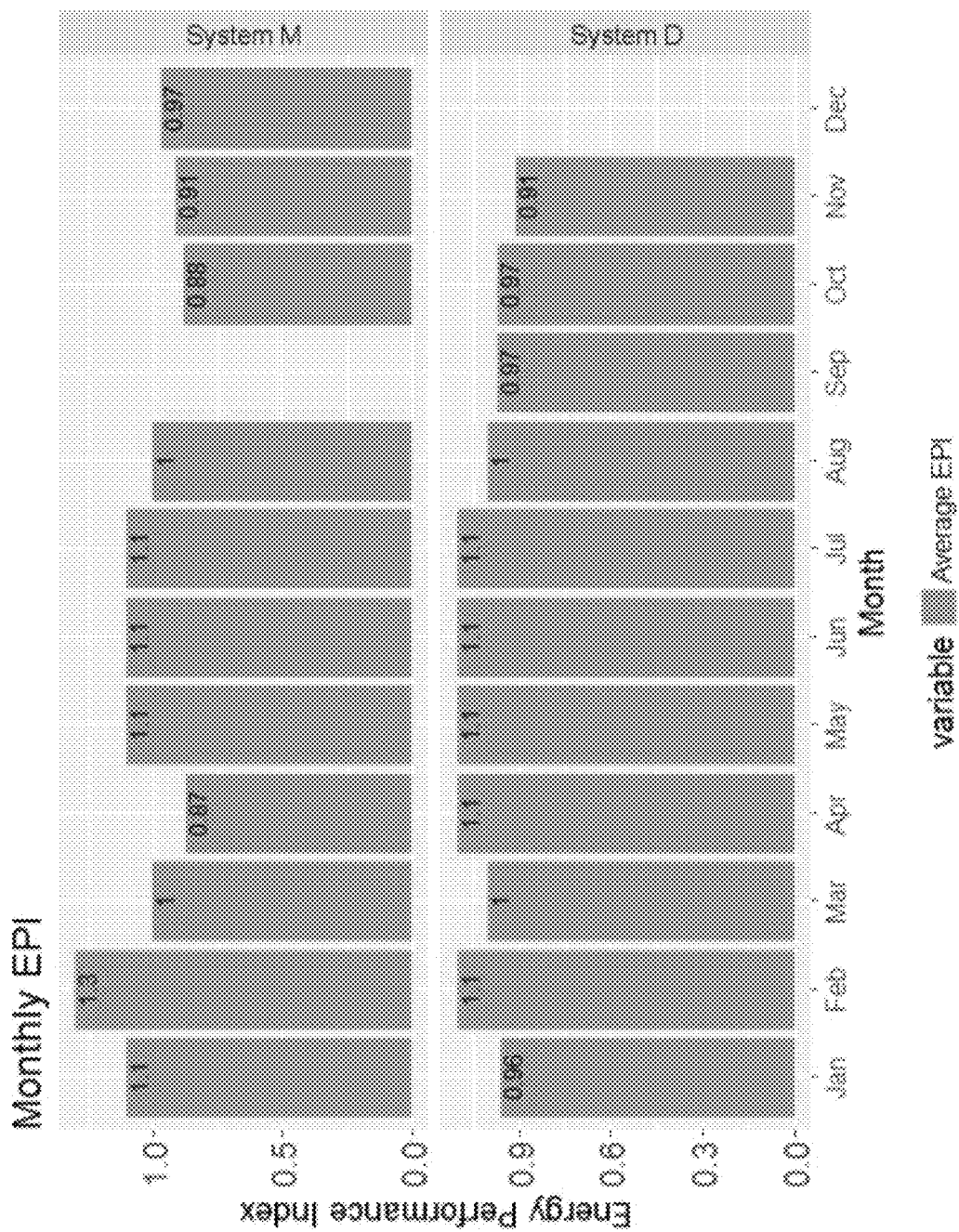
FIG. 25 shows preliminary results for EPI for module 6.
Figure 26:
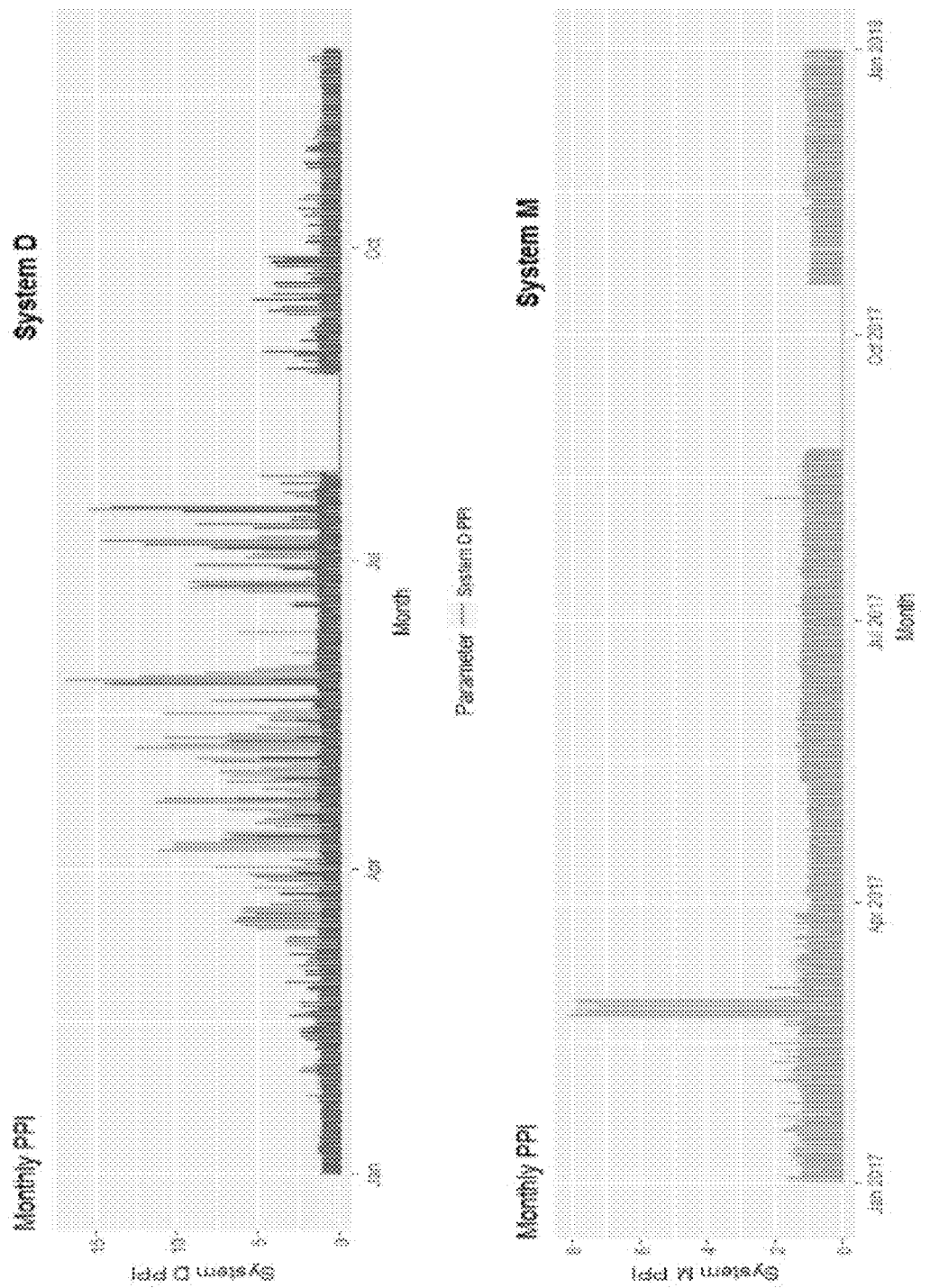
FIG. 26 shows preliminary results for PPI for module 6.

Results have been developed for PPI using 15-minute resolution data, but the model can work with 1-minute resolution as well. Results have been developed for EPI averaging over 1 month, but the window can be reduced to 15 minutes too. FIG. 25 shows preliminary results for EPI; and FIG. 26 shows preliminary results for PPI.

Embodiments of the subject invention can serve as a mobile source of power for users with residential photovoltaic (PV) systems during outage situations caused by normal or extreme (e.g., hurricane) scenarios. This is achieved through real-time monitoring, reporting, and control operations integrated into the hardware and software. A customized plan can be provided to the user for optimally sharing power between the PV, one or more batteries, and optionally a main power grid (e.g., power grid from the utility company), with the goal of minimizing electricity consumption costs. Time-of-use electricity pricing of the local utility company serving the user can also be known by the system and considered.

Figure 31:
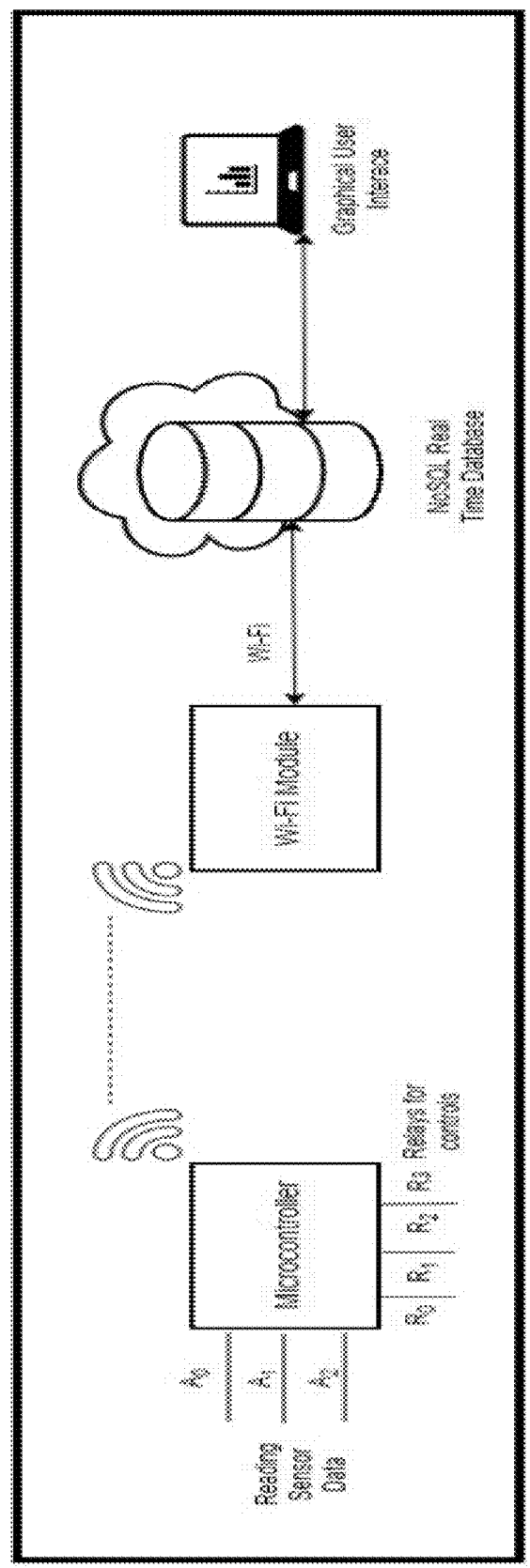
FIG. 31 shows a schematic diagram of a software component of a PEACE-RenGen, according to an embodiment of the subject invention.
Figure 32:
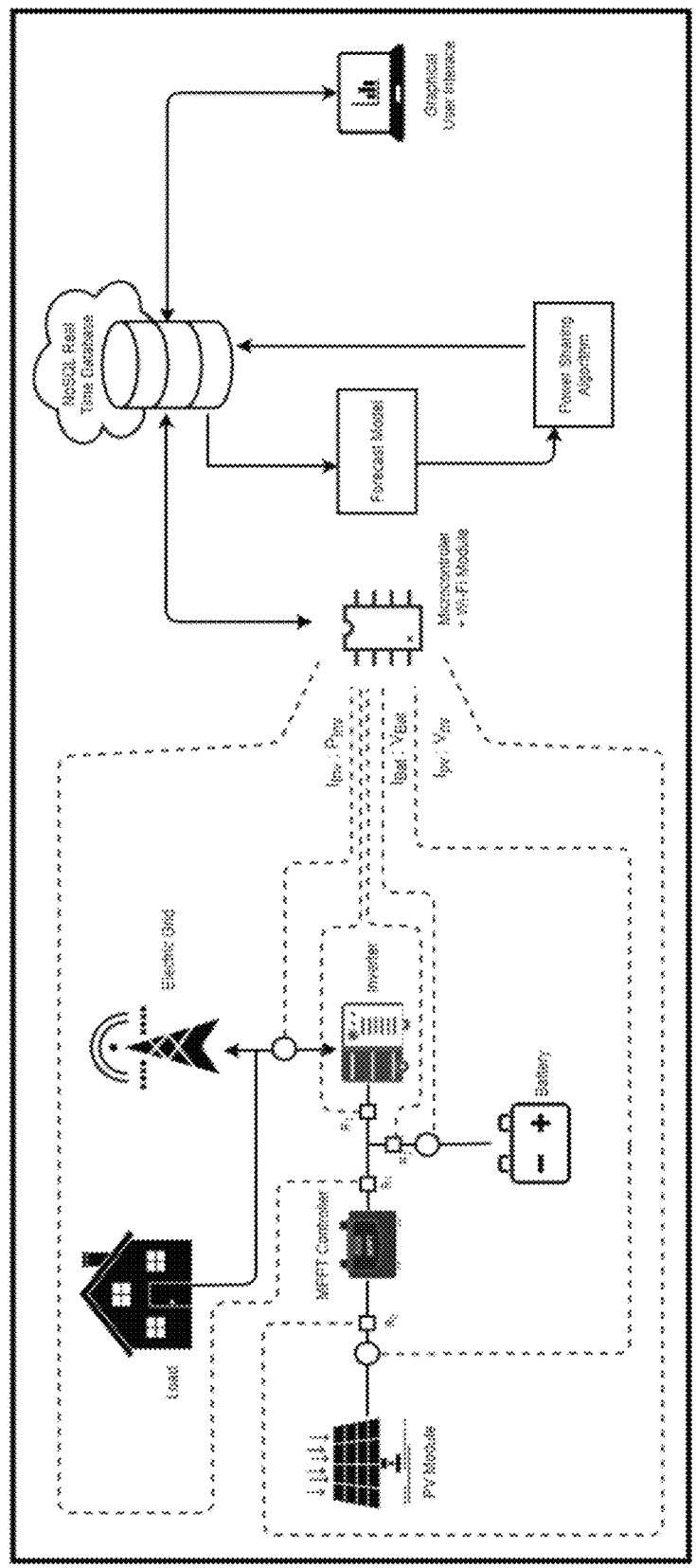
FIG. 32 shows a schematic diagram of a logical representation of system-level architecture of a PEACE-RenGen, according to an embodiment of the subject invention.

FIG. 32 shows a schematic diagram of a logical representation of system-level architecture of a PEACE-RenGen, according to an embodiment of the subject invention, and FIG. 31 shows a schematic diagram of a software component of the PEACE-RenGen.

Referring to FIGS. 31 and 32, the system can include at least one battery, at least one solar panel, at least one microcontroller, and optionally other electronic equipment, such as a smart inverter, at least one charge controller, and/or a wireless (e.g., Wi-Fi) module that sends collected data from sensors to a remote database that can store and synchronize the data in real-time for every connected client (e.g., a NoSQL cloud-hosted database that uses JSON format to store and synchronize the data in real-time to every connected client). It can be a Backend as a Service (BaaS).

The PV module harnesses energy from the sun to charge the battery (or batteries), which, in turn, is used to store energy (e.g., for when the system is not generating solar power). The battery's energy input comes from the PV module on days when there is enough sunlight. The on-board power electronics component distributes the net power to the load (e.g., appliances in the home of the user). The PEACE-RenGen also has the option to be connected to the main power grid. It can maintain a proper charge and power distribution in case it is cloudy or nighttime. The inverter converts the current to be compatible with any type of installation, such as domestic, commercial, or utility-scale. It can work with charge controllers that regulate the use of energy and a battery bank that allows the storage of energy. The software allows a user-friendly, real-time management of residential solar sites for homes, such that the PEACE-RenGen can function as a smart solar power management system.

In an embodiment, a PEACE-RenGen can have a compact, portable hardware design comprising three or four PV modules and a battery bank, where the PV modules are attached and mounted on to a movable base (e.g., using a foldable book-leaf based design where the PV modules can be retracted and folded like a book along a central column). The modules can be opened up and fixed at a uniform angle when in use. The balancing and other physical design constraints can be assessed and be mechanically feasible such that the system is usable for a single residential home's needs. Additionally, a PV thermal (PVT) module can be augmented with the PEACE-RenGen to leverage better energy conversion efficiencies for the same amount of irradiance. This is because a PVT has a water-based cooling system that reduces the effective module temperature, thereby improving the module's conversion efficiency. The heated water can be cycled back into the residence for additional needs.

The PEACE-RenGen software can include a graphical user interface (GUI) that makes it easier for a user to track the different PV module components and estimate their consumption patterns for the power sharing algorithm to use. This data collected by the sensors of the PEACE-RenGen can be transmitted to and stored in a remote database (e.g., a NoSQL cloud-hosted database) wirelessly (e.g., through a Wi-Fi module connected to the microcontroller). The information stored in the remote database can be retrieved and displayed in real-time through the interactive GUI. The ambient temperature, module temperature, and irradiance data captured by the sensors can be used by the forecast model of the software for time series analysis and prediction. Similarly, these features and PV generation data can be used by the regression model of the software to output correlation amongst these parameters.

The power sharing algorithm can take as inputs the 1-day ahead forecasts of the PV module generation and the consumer demand, both delivered in 15-minute time-steps. It can also take as input the state of charge (SOC) of the battery bank at the present instance of time. It can use conditional logic that accounts for multiple-use cases, each of them the different possible combinations of PV generation, battery SOC, consumer demand, and the grid's time-of-use pricing. This is a multi-objective problem. The consumer demand must always be met (otherwise, some load shedding advice will be provided to the consumer), the circumstances where the consumer should buy power from the grid should be minimized, the PV generation should be maximized, and the battery SOC should be within its acceptable bounds at most times. The algorithm can take all these constraints and objectives into consideration in coming up with one or more recommendation plans for the user. These recommendation plans prescribe the times when the battery should be charged from the grid if the PV source is unavailable, the different appliances that must be turned OFF (subject to prioritized appliances pre-set by the consumer when installing PEACE-RenGen) to minimize demand, and more. The PV module yields information, through the sensors installed, about how much PV generation it is producing and the module and ambient temperatures. This information can be displayed on the GUI. The batteries, through the sensors, can yield information about their health, charge and discharge levels, and temperature. This information can be aggregated on power meter data logs, which can also aggregate the electricity produced by the PV module and the battery and the power used by the system, when in use.

The PEACE-RenGen can include at least the following hardware components: relays; current sensors; voltage sensors; a microcontroller with wireless capability (e.g., with a WiFi module); an inverter; and temperature sensors. The relays can be power interruption devices that can be used to assign power without having to open and close a switch manually. The current and voltage sensors can collect data in real time and send it to the remote database in real time, operating through the microcontroller. The inverter can convert DC power from the PV and the battery to AC power. Also, the inverter can be used as a source to charge the battery from the utility grid whenever the PV power production is not available or is insufficient. The temperature sensors measure temperatures of the battery, PV, and the ambient environment. The PEACE-RenGen can include at least the following software components: a forecast model; and a power sharing algorithm. A battery SOC-lookup table can also optionally be included. The forecast model can conduct time-series forecasts of irradiance, ambient temperature, and module temperature, which are fed into a PV generation prediction model to obtain the corresponding forecasts of generation. This value is fed as one of the inputs into the power sharing algorithm. The battery SOC-lookup table can be generated using an open circuit voltage method. The power sharing algorithm can provide dynamic plans on when to charge/discharge the battery and manage the available power between the PV, battery, and grid (if connected) in an optimal manner based on real-time and historical data.

The client-facing website runs on a localhost, specifically on a Windows platform. The GUI will be activated once the index.html file is run. This file is executed on a web browser. The operating environment of the hardware component is in residential areas where PV module and battery are locally installed. These devices can be connected to the microcontroller wirelessly (e.g., via a Wi-Fi module). The microcontroller can interact with sensors that collect current, voltage, and temperature data. This data can be sent to a remote database (e.g., a NoSQL cloud-hosted database) wirelessly (e.g., via a Wi-Fi module). The system can run on any operating system (e.g., Windows or iOS). The system can be installed in a location will with a high solar index, and the installation location can have conditions to host a high-grade battery and solar panels.

The GUI can give users the ability to rely on affordable energy efficiency. The GUI can be user-friendly to help ensure that the user spends most of the time using the device rather than figuring out how to use it. The dashboard of the GUI can include a menu with a list of charts that display the data collected from the hardware components. Hence, the user can view multiple charts on the dashboard.

The inverter can utilize maximum power point tracking. A maximum power point tracker (MPPT) is an electronic DC to DC converter that optimizes the match between solar array (PV panels) and a battery bank. This technique provides the best possible current and voltage level for max power output. Afterward, the inverter can convert DC electricity generated by the PV panels into AC. In addition, the inverter can synchronize the PV panel's output to the electric grid (e.g., operating at 120 Vrms/60 Hz). This can allow the user to collect excess energy that is not being used by power electric loads or in charging the battery banks. The inverter can include any or all of the following features: 1000 W rated, DC 24V convert to AC 120V; both DC and AC inputs, maximum 15 A utility charge; low frequency transformer built in; multiple operational protections; compatible with GEL, AGM, lead acid, and calcium batteries. In a specific embodiment, the inverter can have the following specifications: a rated DC input of 24 VDC; a utility AC input of 75-135 VAC; a charging current of 10-15 A; a rated output power of 1000 W; a stable output voltage of 120 V±3%; an output frequency of 60 Hz±1%; an efficiency of 98% or more; a protection class of IP30; a THD of 3%; an overload of 120% 10 min, 150% 1 min; a work temperature of −20° C.-50° C.; communication port(s) of one or more of RS232/R11/J45 (optional); dimensions of 30 cm×21 cm×21 cm (11.81 in×8.27 in×8.27 in); and a weight of 13.0 kg (28.66 lb).

A solid state DC-AC relay can be used to control the flow of energy at the grid side of the three-way tie. They are controlled by a small DC signal (e.g., 3-32V signal) sent from a microcontroller, which triggers the load side to close the circuit. Solid state DC-DC relays can be used to control the flow of energy to and from a lead acid battery, as well as for implementing a switching circuit between the PV modules. They can be controlled by a small DC signal (e.g., 3-32V signal) sent from a microcontroller, which triggers the load side to close the circuit. The input can be the microcontroller (e.g., wirelessly via, for example, a WiFi module). The relays can: isolate the load circuit from the input circuit by either optical photo couplers or using a technique called galvanic isolation; have high reliability, high efficiency, and long lifespan; can have no electric spark, no noise, and no contact; have desirable levels of electromagnetic interference, sensitivity, and switching speed; have low drive voltage and current; and be especially suitable for corrosion resistance, moisture resistance, dust resistance, and other harsh environments. In a specific embodiment, a DC-AC relay can have: a trigger current or 7.5 mA/12V; a control voltage of 24-380 VAC; an input voltage of 3-32 VDC; and a maximum load current of 40 A. In a specific embodiment, a DC-DC relay can have: an input voltage of 3-32 VDC; an output voltage of 5-80 VDC; and an output current of 100 A. The DC-AC relay can have a size of, for example, 6.2 cm×4.4 cm×2.6 cm; and the DC-DC relay can have a size of, for example, 8 cm×5 cm×7.2 cm.

A microcontroller can serve as a data logger, and it can collect voltage, amperage, temperature, and other required data from each main electrical diagram. In addition, the microcontroller can serve as an actuator by turning on/off one or more relays (e.g., solid state relays such as DC-AC solid state relays and/or DC-DC solid state relays). The microcontroller can be an MPPT with a display (e.g., an LCD display), and can have an efficiency of 99% or higher. The microcontroller can employ a DC converting circuit with a conversion efficiency of 96% or higher. The microcontroller can have multiple (e.g., five) output modes and can have advanced electronic protection. The microcontroller can have a three-stage charging algorithm (impulse, bulk, and float) and can have a built-in timer. In a specific embodiment, the microcontroller can have the following specifications: a rated system voltage of 12 V/24 VDC; a maximum solar panel power of 250 W 12 V/500 W 24 V; a maximum output current of 20 A; a maximum discharge current of 20 A; an over discharge voltage of 10.2-12.5V (0.2) 12 V/20.4-25.0 V (0.2) 24 V; a restart voltage of 10.3-13.5 V (0.2) 12 V/20.5-27.0 V (0.2) 24 V; a constant voltage (over charge voltage) of 13.0-15.5 V (0.2) 12 V/26.0-31.0 V (0.2) 24 V; a float voltage of 12.5-14.5 V (0.2) 12 V/25.0-29.0 V (0.2) 24 V; a buck converter type; a converter efficiency of 96% or more; a maximum increase efficiency of 98% or more; a clock precision of 50 seconds per month; a charging algorithm of PWM three-stage; a size of size of 5.5 in×5.8 in×1.6 in (140 mm×147 mm×42 mm); and a weight of 1.21 lbs (550 g).

The battery bank can include, for example, sealed lead-acid batteries that store all the excess energy generated by the PV module. These batteries differ from conventional batteries in that they are able to withstand a large amount of current draw for extended periods of time, comparable to conventional lead acid batteries on the market, due to their robustness. The batteries can include any or all of the following features: sealed lead-acid; absorbent Glass MAT (AGM) technology for superior performance; and valve regulated, spill-proof construction allowing safe operation in any position. In a specific embodiment, the battery bank can have the following specifications: a nominal capacity of 20 hours (12.5 A)=250 Ah; an internal resistance of 4 m; a charge current of 75 A; a bulk charge voltage of 14.6 V-14.8 V; a float charge of 13.6 V-13.8 V; a length of 20.47 in (519.9 mm); a width of 10.55 in (268 mm); a height of 8.66 in (220 mm); a thickness of 9.65 in (245.1 mm); and a weight of 154 lb. The charge time can be as fast as the maximum system current allows with respect to the capacity. The charge controller can be set to a certain bulk, absorption, and float current that can charge the battery. Degradation of a battery below the standard 80% nominal capacity used in the field can affect performance. The maximum charge/discharge current (for example, 75 A) can have a large impact on the temperature of the battery. The temperature is also proportional to the life of the battery; therefore, the current should always be kept below the maximum current.

The microcontroller can collect sensor data and wirelessly (e.g., via a Wi-Fi module) push the data to a remote database (e.g., a NoSQL cloud-hosted database). The GUI can retrieve the data from the database and create graphs for visualization. The GUI can update and display data for PV generation, ambient temperature, and module temperature in real-time. The GUI can be built using, for example, one or a combination of multiple languages like HTML5, Python, CSS3, Chart.js, Bootstrap, jQuery, and/or JavaScript. The forecasting model and regression model can use, for example, Python for performing time series analysis over ambient temperature, module temperature, PV generation, and irradiance data.

Figure 33B:
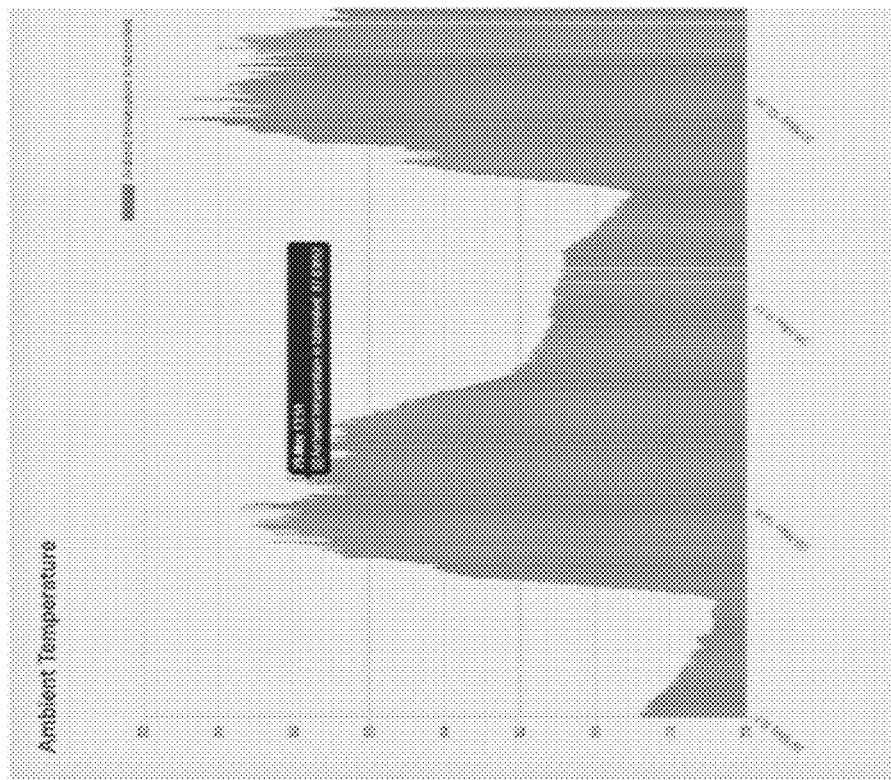
FIG. 33B shows a plot of real-time module temperature (versus time), over the same time period as FIG. 33A.
Figure 33A:
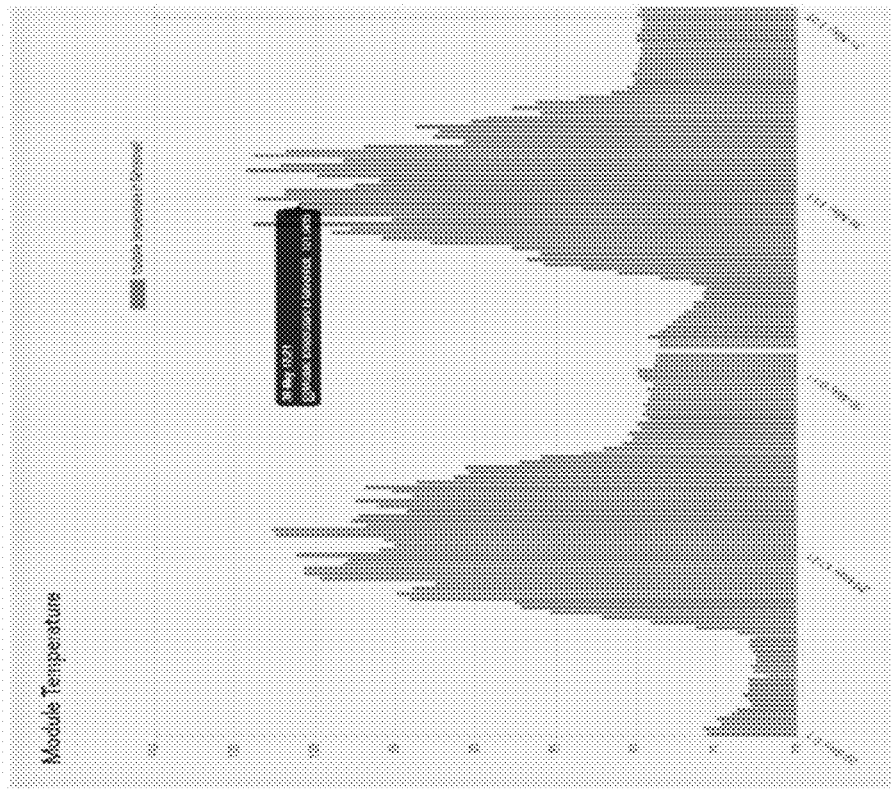
FIG. 33A shows a plot of real-time ambient temperature (versus time).

The GUI can comprise and/or interact with a website. The website can be domain specific, allowing a user to login, register, and navigate through the GUI. The GUI can provide real-time visualization of the data (e.g., module temperature, ambient temperature, PV generation, and irradiance) collected by the sensors and sent to the remote database. The website can include a landing page that provides information about the system and its functionality while also allowing user access to registration, login, and dashboard portal and/or support modules. A login page can allow authenticated users to login to monitor the dashboard portal. It can allow registration of new users, while also validating and verifying the user by sending a verification link to the email address used for registration. Only after the account is verified through email verification can it be used for logging into the portal. Account recovery can be supported (e.g., via password reset) for users facing trouble signing in. The dashboard for the corresponding PV module can be displayed can be displayed after a successful login. The dashboard can enable real-time monitoring of PV module components, PV generation, module temperature, ambient temperature, and irradiance. It can provide a graphical visualization of the updates for all the weather parameters captured by sensors in real time (e.g., for a 5-minute time resolution). This visualization can help users infer the PV generation and other weather parameters. The weather and PV module data can be stored and retrieved from a database (e.g., a remote database such as a real time cloud based database). The GIU can allow users to navigate across different pages through session tokens. FIG. 33A shows a plot of real-time ambient temperature (versus time), and FIG. 33B shows a plot of real-time module temperature (versus time), over the same time period as FIG. 33A. These are examples of what these can look like in the GUI.

Figure 34:
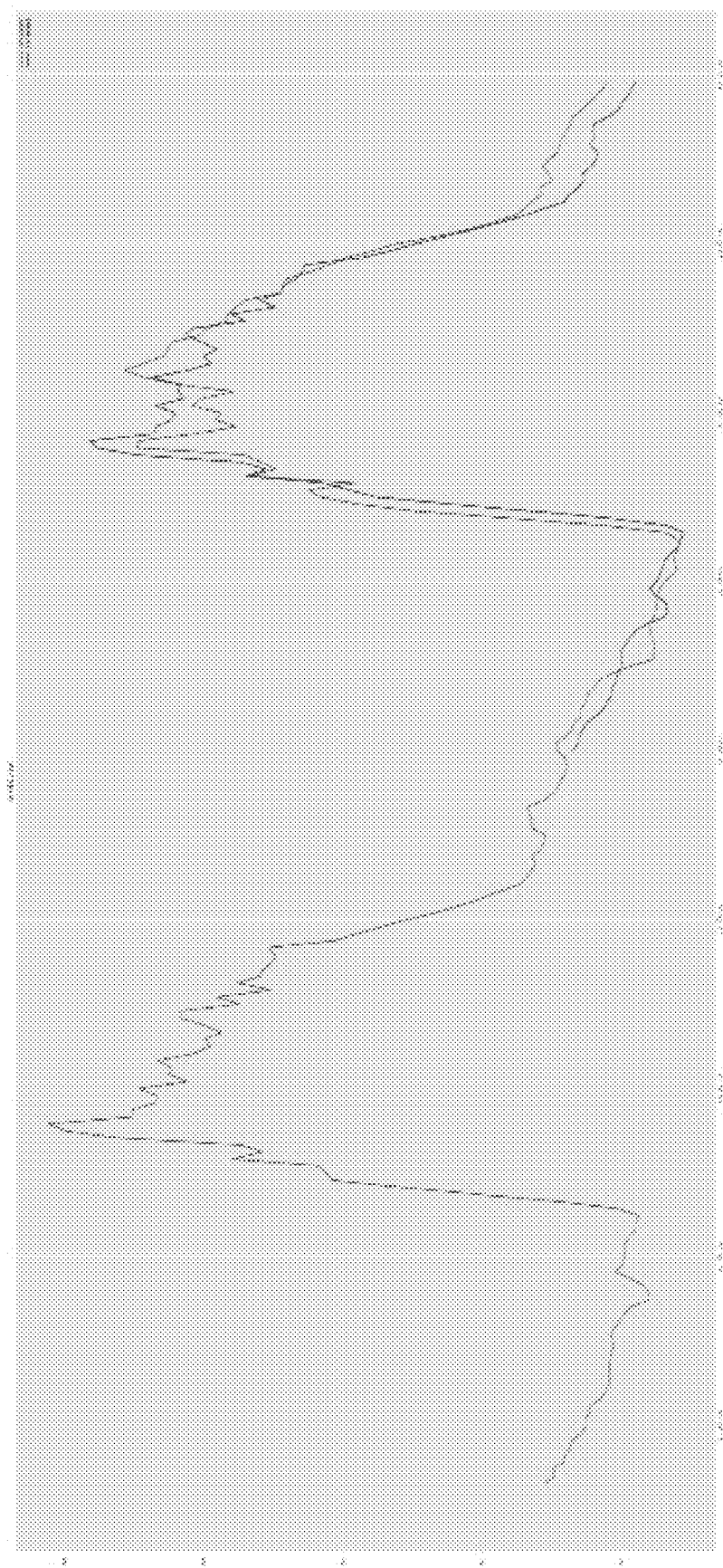
FIG. 34 shows a plot of ambient temperature versus time, where the curve that is slightly higher at the far-right end of the plot is for observed temperature and the other curve is for forecasted temperature.
Figure 35:
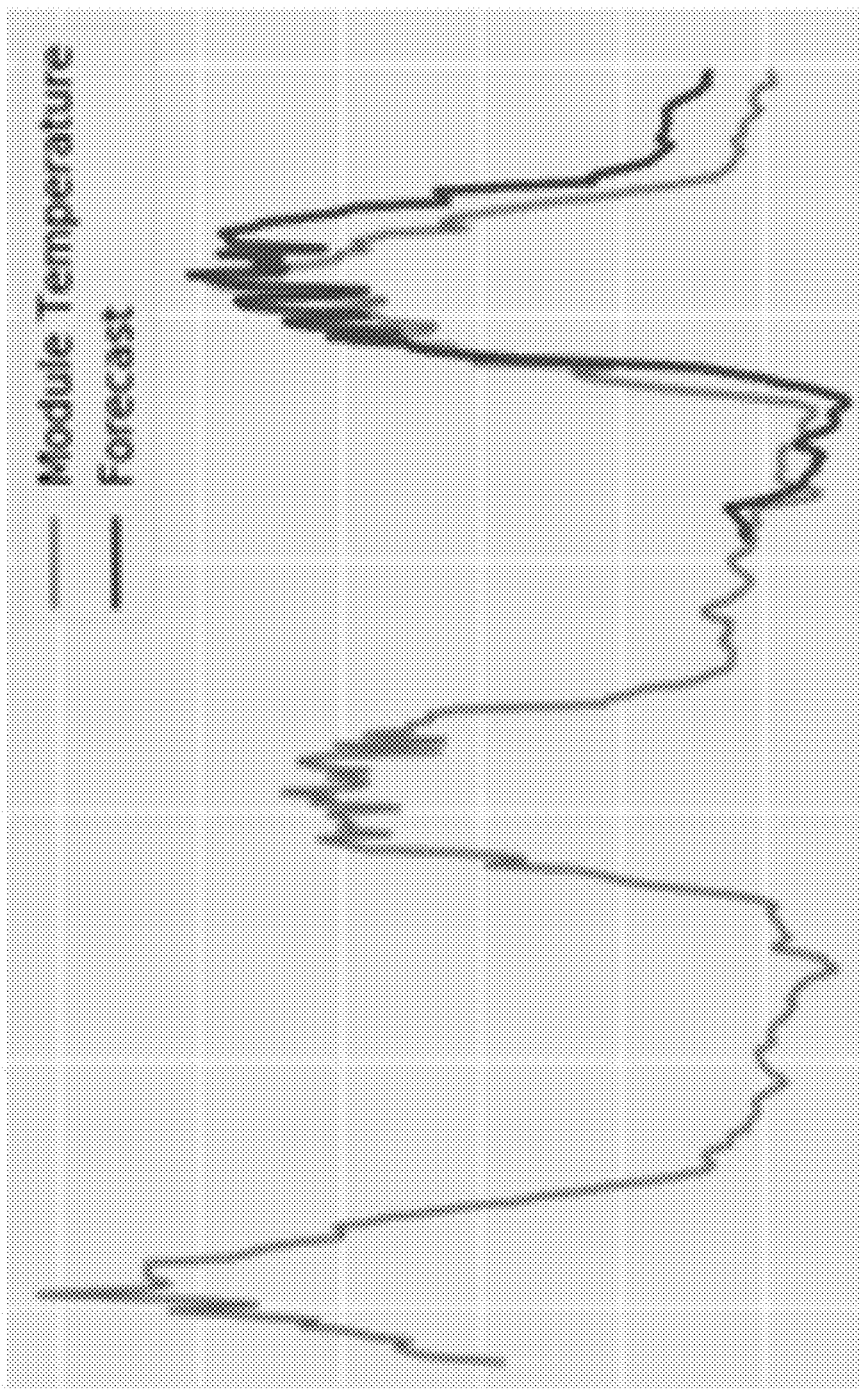
FIG. 35 shows a plot of module temperature versus time, where the curve that is slightly lower at the far-right end of the plot is for observed temperature and the other curve is for forecasted temperature.
Figure 36:
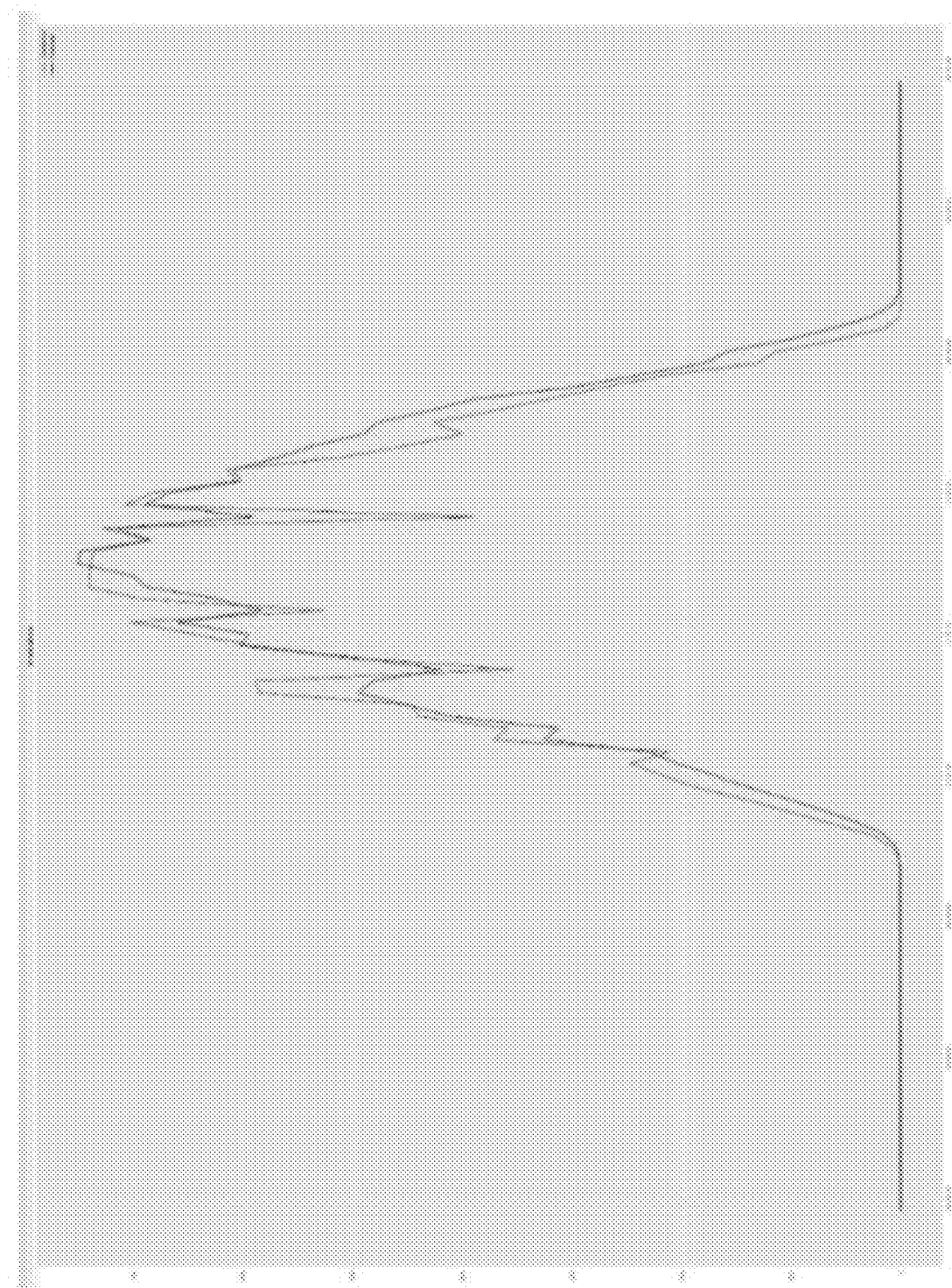
FIG. 36 shows a plot of irradiance versus time, where the curve that has the large downward spike near the middle is for observed irradiance and the other curve is for forecasted irradiance.

The forecasting model can use as inputs ambient temperature, module temperature, and output a forecast for N steps ahead. The forecasting model can capture a suite of different standard temporal structures in time series data and perform univariate predictions over one or more of the input parameters. The forecasted values for ambient temperature, module temperature, and irradiance can be sent to the prediction model, with historical parameters as inputs and one or more steps ahead (e.g., n steps ahead) being forecast for each input parameter. The platform can be, for example, Python, though embodiments are not necessarily limited thereto. FIGS. 34-36 show plots obtained by the forecasting model.

Figures 37A, 37B, 37C:
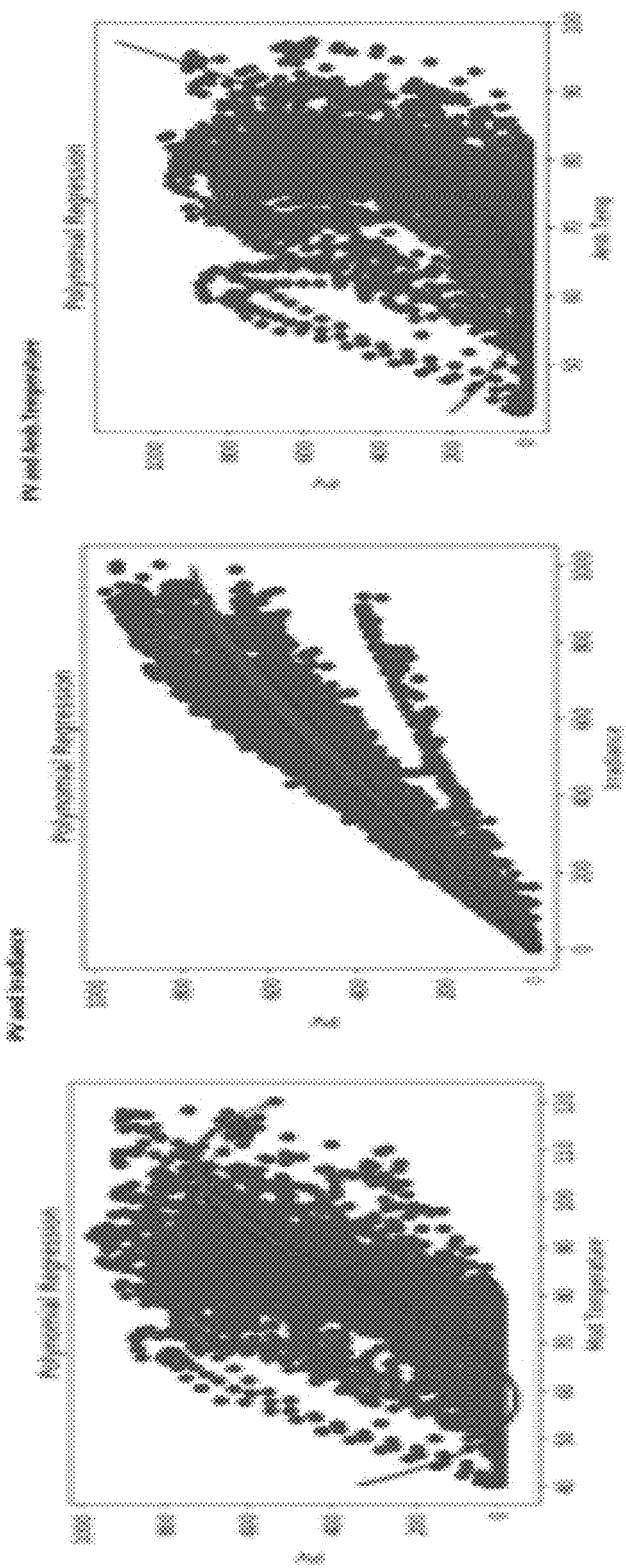
FIG. 37A shows a polynomial regression plot for photovoltaic (PV) generation versus module temperature.
FIG. 37B shows a polynomial regression plot for PV generation versus irradiance.
FIG. 37C shows a polynomial regression plot for PV generation versus ambient temperature.

A polynomial regression model can be used because there is a relationship between PV generation, module temperature, irradiance, and ambient temperature. The regression model can help understand the correlations between these parameters, and the model can perform polynomial regression to map relations between, and establish equations for, PV generation versus irradiance (see FIG. 37B), PV generation versus ambient temperature (see FIG. 37C), and PV generation versus module temperature (see FIG. 37A).

Figure 38B:
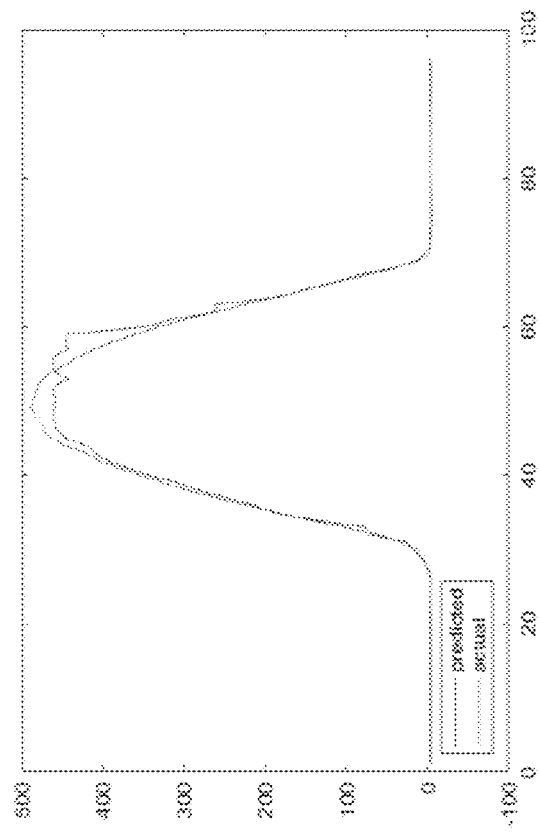
FIG. 38B shows a plot of PV generation over time, showing forecast (predicted) and actual values for a sunny day.
Figure 38A:
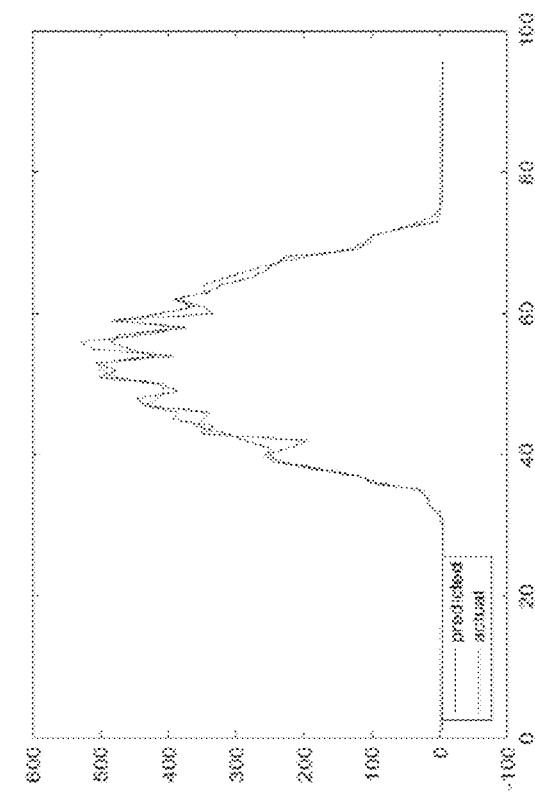
FIG. 38A shows a plot of PV generation over time, showing forecast (predicted) and actual values for a cloudy day.

A prediction model can be used, with inputs of 1-day-ahead, 15-minute-time-step forecasts of irradiance, ambient temperature, and module temperature (I, AT, MT). Further inputs can be the polynomial regression model outputs (M1, M2, M3). The output can be 1-day-ahead, 15-minute-time-step values of PV generation (PVG). The platforms used can be, for example, R, MATLAB, and Python, though embodiments are not necessarily limited thereto. FIG. 38A shows a plot of PVG over time, showing forecast (predicted) and actual values for a cloudy day (RMSE=19.5153; MSE=380.8478; MAE=9.8511; R-Sq=0.9879; and MSE loss=0.0013). FIG. 38B shows a plot of PVG over time, showing forecast (predicted) and actual values for a sunny day (RMSE=15.2596; MSE=232.8559; MAE=7.7420;

R-Sq=0.9930; and MSE loss=0.0009). FIGS. 38A and 38B were obtained with the prediction model.

The power sharing algorithm can provide the ability to constantly retrieve data from the database, and implement it on the interface in real-time. The interface collects data in real-time and contains several features, allowing the user to manipulate the information however the user wants. The information collected from hardware components can be used as input(s) in the power sharing algorithm, to maximum the usage and optimize power consumption through the battery and/or the grid. Conditional logic can be used to provide recommendations to the user of the GUI by considering PV generation, battery SOC, demand, and time of use based on pricing of grid.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media and machine-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1

Figure 27:
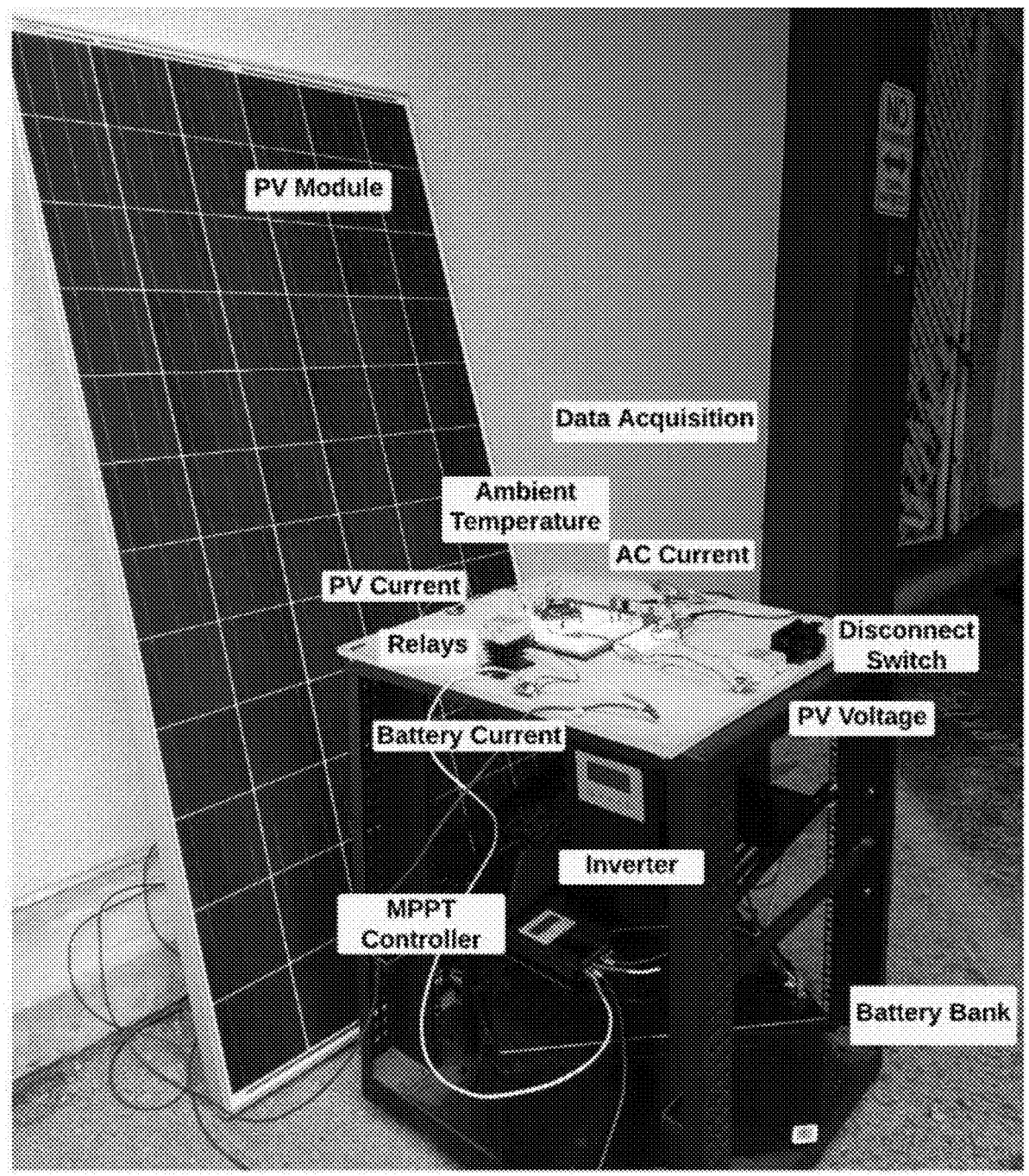
FIG. 27 shows an image of a PEACE Supplier system according to an embodiment of the subject invention.
Figure 28:
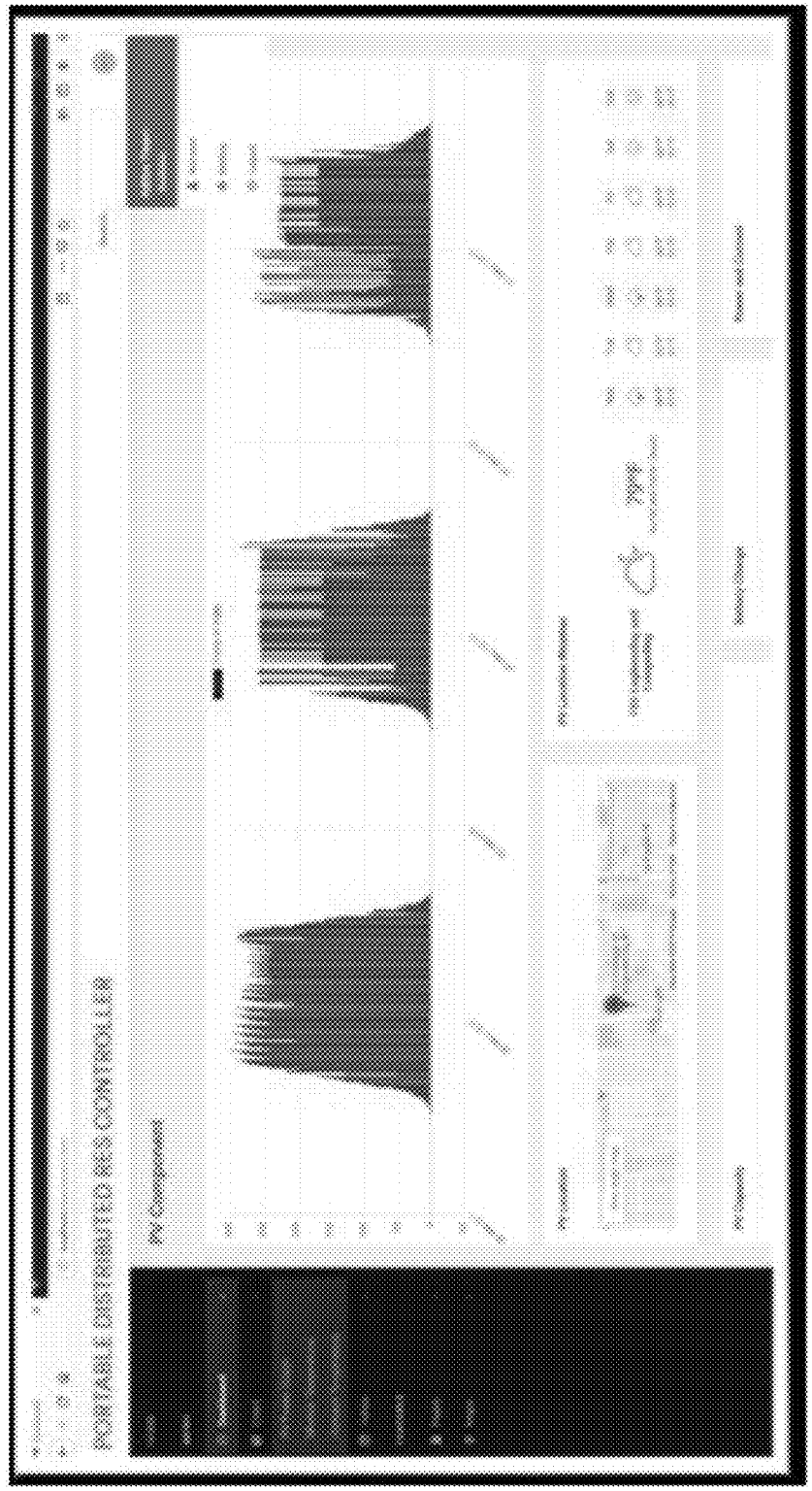
FIG. 28 shows an image of a web interface to be used with a PEACE Supplier, according to an embodiment of the subject invention.
Figure 29:
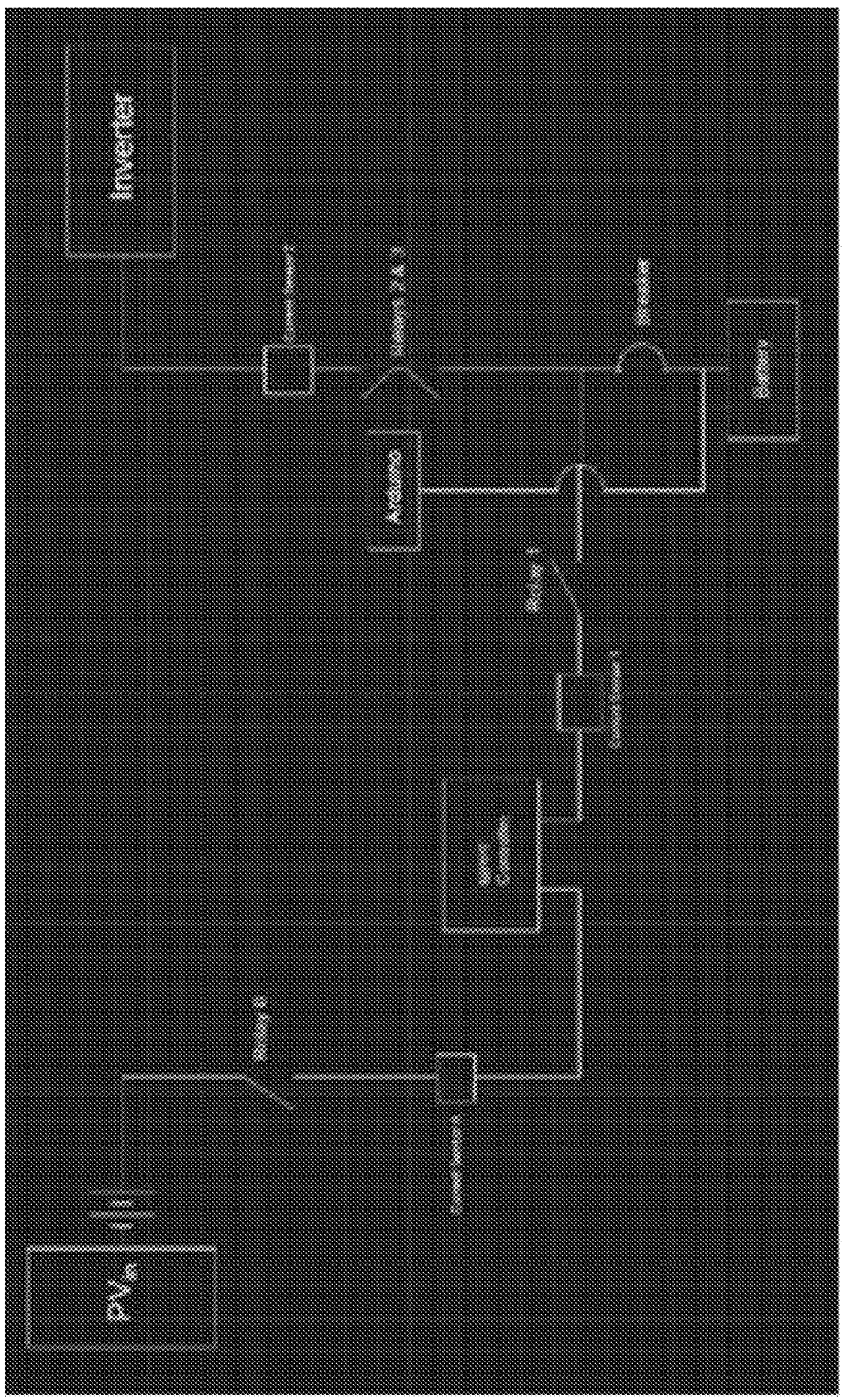
FIG. 29 shows a circuit diagram for a PEACE Supplier, according to an embodiment of the subject invention.
Figure 30:
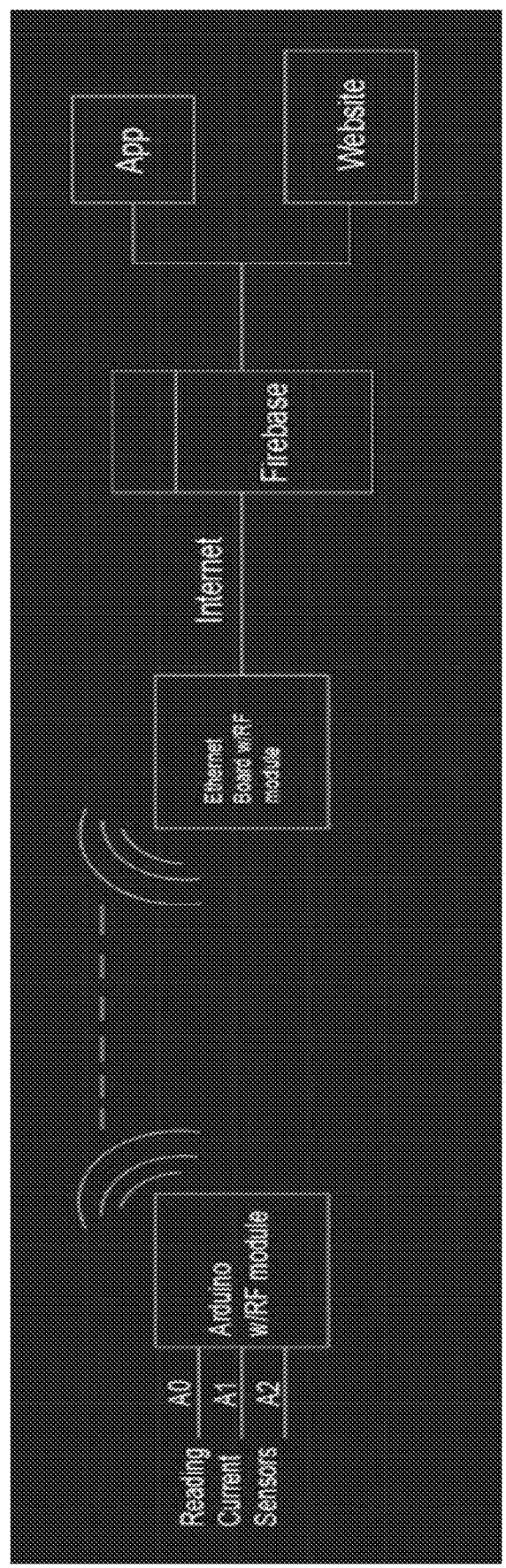
FIG. 30 shows a schematic diagram for a PEACE Supplier system, according to an embodiment of the subject invention.

A hardware-software integrated PEACE Supplier system was fabricated using sealed lead acid batteries as the ESU technology. This prototype is shown in FIG. 27. FIG. 28 shows an image of the web interface to be used with the PEACE Supplier; FIG. 29 shows circuit diagrams for the PEACE Supplier; and FIG. 30 shows a schematic diagram for the PEACE Supplier system.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

What is claimed is:

1. A system for managing power, the system comprising:
a battery bank comprising at least one battery;
a photovoltaic (PV) module comprising at least one solar panel;
an inverter in operable communication with the battery bank and the PV module;
a microcontroller in operable communication with the inverter, the battery bank, and the PV module;
a machine-readable medium that uses information from the microcontroller to derive a power sharing plan; and
a processor in operable communication with the machine-readable medium,
the machine-readable medium having instructions stored thereon that, when executed by the processor, perform a forecast model and a power sharing algorithm using the information from the microcontroller to derive the power sharing plan for power distribution and storage among the PV module, the battery bank, and a load connected to the system, and
the machine-readable medium comprising a graphical user interface (GUI) configured to allow a user to enter constraints for the power sharing plan.

2. The system according to claim 1, the microcontroller comprising a wireless module configured to wirelessly communicate with a remote database and to send data from the battery bank and the PV module to the remote database,
the machine-readable medium obtaining the information from the microcontroller via the remote database.

3. The system according to claim 1, the microcontroller comprising a Wi-Fi module to enable wireless communication.

4. The system according to claim 1, further comprising a plurality of temperature sensors in operable communication with the microcontroller, the plurality of temperature sensors measuring a temperature of the PV module, a temperature of the battery bank, and an ambient temperature.

5. The system according to claim 1, further comprising a current sensor and a voltage sensor both in operable communication with the microcontroller, the current sensor measuring a current of the system, and the voltage sensor measuring a voltage of the system.

6. The system according to claim 1, the information from the microcontroller comprising a real-time temperature of the PV module, a real-time temperature of the battery bank, and a real-time ambient temperature,
the forecasting model using as inputs historical values of the temperature of the PV module, the temperature of the battery bank, and the ambient temperature to provide a forecast temperature of the PV module, a forecast temperature of the battery bank, and a forecast ambient temperature, and
the power sharing algorithm using as inputs the forecast temperature of the PV module, the forecast temperature of the battery bank, and the forecast ambient temperature to output the power sharing plan.

7. The system according to claim 6, the information from the microcontroller further comprising a real-time current of the system and a real-time voltage of the system,
the forecasting model further using as inputs historical values of the current of the system and the voltage of the system to provide a forecast current of the system and a forecast voltage of the system, and
the power sharing algorithm further using as inputs the forecast current of the system and the forecast voltage of the system to output the power sharing plan.

8. The system according to claim 1, the information from the microcontroller comprising a real-time current of the system and a real-time voltage of the system,
the forecasting model using as inputs historical values of the current of the system and the voltage of the system to provide a forecast current of the system and a forecast voltage of the system, and
the power sharing algorithm using as inputs the forecast current of the system and the forecast voltage of the system to output the power sharing plan.

9. The system according to claim 1, the power sharing plan meeting the following constraints: a demand for power of the user is met; purchasing of power from a power grid is minimized; PV generation is maximized; and a state of charge (SOC) of each battery of the at least one battery is within its acceptable bounds.

10. The system according to claim 1, the inverter comprising a maximum power point tracker (MPPT) controller.

11. The system according to claim 1, the machine-readable medium having further stored thereon a battery state of charge (SOC) lookup table, the battery SOC lookup table being generated using an open circuit voltage method, and
the power sharing algorithm using the battery SOC lookup table when deriving the power sharing plan.

12. A method for managing power, the method comprising:
providing a power system comprising: a battery bank comprising at least one battery; a photovoltaic (PV) module comprising at least one solar panel; an inverter in operable communication with the battery bank and the PV module; and a microcontroller in operable communication with the inverter, the battery bank, and the PV module;
measuring, by a plurality of sensors, parameters of the power system and the ambient environment;
sending the parameters to the microcontroller;
sending, by the microcontroller, the parameters to a remote database;
obtaining, by a machine-readable medium, the parameters from the remote database;
performing, by a processor in operable communication with the machine-readable medium, a forecast model using the parameters to generate a first output; and
performing, by the processor, a power sharing algorithm using the first output as an input to derive a power sharing plan for power distribution and storage among the PV module, the battery bank, and a load connected to the power system,
the machine-readable medium comprising a graphical user interface (GUI) configured to allow a user to enter constraints for the power sharing plan.

13. The method according to claim 12, the microcontroller comprising a wireless module configured to wirelessly communicate with the remote database.

14. The method according to claim 12, the microcontroller comprising a Wi-Fi module to enable wireless communication.

15. The method according to claim 12, the plurality of sensors comprising a plurality of temperature sensors,
the parameters comprising a temperature of the PV module, a temperature of the battery bank, and an ambient temperature, and
the first output comprising a forecast temperature of the PV module, a forecast temperature of the battery bank, and a forecast ambient temperature.

16. The method according to claim 15, the plurality of sensors comprising a current sensor measuring a current of the power system and a voltage sensor measuring a voltage of the system,
the parameters comprising the current of the power system and the voltage of the power system, and
the first output comprising a forecast current of the power system and a forecast voltage of the power system.

17. The method according to claim 12, the plurality of sensors comprising a current sensor measuring a current of the power system and a voltage sensor measuring a voltage of the system,
the parameters comprising the current of the power system and the voltage of the power system, and
the first output comprising a forecast current of the power system and a forecast voltage of the power system.

18. The method according to claim 12, the power sharing plan meeting the following constraints: a demand for power of the user is met; purchasing of power from a power grid is minimized; PV generation is maximized; and a state of charge (SOC) of each battery of the at least one battery is within its acceptable bounds.

19. The method according to claim 12, the machine-readable medium having stored thereon a battery state of charge (SOC) lookup table, the battery SOC lookup table being generated using an open circuit voltage method, and
the power sharing algorithm using the battery SOC lookup table when deriving the power sharing plan.

20. A system for managing power, the system comprising:
a battery bank comprising at least one battery;
a photovoltaic (PV) module comprising at least one solar panel;
an inverter in operable communication with the battery bank and the PV module;
a microcontroller in operable communication with the inverter, the battery bank, and the PV module;
a plurality of temperature sensors in operable communication with the microcontroller, the plurality of temperature sensors measuring a temperature of the PV module, a temperature of the battery bank, and an ambient temperature;
a current sensor and a voltage sensor both in operable communication with the microcontroller, the current sensor measuring a current of the system and the voltage sensor measuring a voltage of the system;
a machine-readable medium that uses information from the microcontroller to derive a power sharing plan; and
a processor in operable communication with the machine-readable medium,
the machine-readable medium having instructions stored thereon that, when executed by the processor, perform a forecast model and a power sharing algorithm using the information from the microcontroller to derive the power sharing plan for power distribution and storage among the PV module, the battery bank, and a load connected to the system, the machine-readable medium comprising a graphical user interface (GUI) configured to allow a user to enter constraints for the power sharing plan, the microcontroller comprising a WiFi module configured to wirelessly communicate with a remote database and to send data from the battery bank and the PV module to the remote database, the machine-readable medium obtaining the information from the microcontroller via the remote database, the system further comprising a plurality of temperature sensors in operable communication with the microcontroller, the plurality of temperature sensors measuring a temperature of the PV module, a temperature of the battery bank, and an ambient temperature, the information from the microcontroller comprising a real-time temperature of the PV module, a real-time temperature of the battery bank, a real-time ambient temperature, a real-time current of the system, and a real-time voltage of the system, the forecasting model using as inputs historical values of the temperature of the PV module, the temperature of the battery bank, the ambient temperature, the current of the system, and the voltage of the system to provide a forecast temperature of the PV module, a forecast temperature of the battery bank, a forecast ambient temperature, a forecast current of the system, and a forecast voltage of the system, the power sharing algorithm using as inputs the forecast temperature of the PV module, the forecast temperature of the battery bank, the forecast ambient temperature, the forecast current of the system, and the forecast voltage of the system to output the power sharing plan, the power sharing plan meeting the following constraints: a demand for power of the user is met; purchasing of power from a power grid is minimized; PV generation is maximized;

and a state of charge (SOC) of each battery of the at least one battery is within its acceptable bounds, the inverter comprising a maximum power point tracker (MPPT) controller, the machine-readable medium having further stored thereon a battery SOC lookup table, the battery SOC lookup table being generated using an open circuit voltage method, and the power sharing algorithm using the battery SOC lookup table when deriving the power sharing plan.

* * * * *